United States Patent
Iben et al.

(10) Patent No.: US 12,482,492 B1
(45) Date of Patent: Nov. 25, 2025

(54) TAPE HEAD WAFER DESIGN FOR MULTIPLE FORMATS USING SAME TAPE

(71) Applicant: INTERNATIONAL BUSINESS MACHINES CORPORATION, Armonk, NY (US)

(72) Inventors: Icko E. T. Iben, San Jose, CA (US); David Lee Swanson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 19/001,957

(22) Filed: Dec. 26, 2024

(51) Int. Cl.
- *G11B 5/58* (2006.01)
- *G11B 5/008* (2006.01)
- *G11B 5/55* (2006.01)
- *G11B 5/596* (2006.01)

(52) U.S. Cl.
CPC ...... *G11B 5/59688* (2013.01); *G11B 5/00878* (2013.01)

(58) Field of Classification Search
CPC ....... G11B 5/584; G11B 5/588; G11B 5/5965; G11B 5/59655; G11B 5/5504; G11B 5/5508; G11B 5/5513

USPC ...................................................... 360/77.12
See application file for complete search history.

(56) References Cited

U.S. PATENT DOCUMENTS

| | | | |
|---|---|---|---|
| 7,681,793 B2 | 3/2010 | Biskeborn et al. | |
| 7,724,465 B2 | 5/2010 | Koeppe | |
| 11,935,562 B2 * | 3/2024 | Biskeborn | G11B 5/584 |

OTHER PUBLICATIONS

Authors et al.: Disclosed Without Attribution, IP.com No. IPCOM000267051D, "Reader/Writer Tape Head Module Having Multiple Rows of Elements Built on Different Pitch Spacing", Sep. 20, 2021, 4 pages.

* cited by examiner

*Primary Examiner* — Nabil Z Hindi
(74) *Attorney, Agent, or Firm* — Seed Intellectual Property Law Group LLP

(57) ABSTRACT

A tape head adapted to 32-, 64-, and 128-channel operation is provided. A plurality of elements is provided, numbering $N_E$, comprising first and second sets of 64 evenly-spaced elements, each set comprising at least a first element and a last element. A plurality of servos is provided, comprising at least a first through sixth servo. The 64 evenly-spaced elements of each set are separated by an element pitch ($W_{EP}$). The evenly-spaced elements and plurality of servos are spaced as set forth herein.

23 Claims, 21 Drawing Sheets

Solutions. Optimization: $W_{TP} = 200nm$, $W_{Edge} = 560 \mu m$ file: C:\MATLAB\work\Dir_Drive_ProductData\ChipDesign\PitchOutput\ChipDesign0010_1a & 1b.csv
Date: 2/22/2024
Info: Optimize Element & Servo Spacing; etc. Match Swanson's Buffers
Design: OPTIMIZE {Short;Long}: Rev S;E;S;E;S: 2x{SDE-Short;ES-Long}

| | | | | | | | | | | | | | | | | | | | | | | | Legacy | |
|---|---|---|---|---|---|---|---|---|---|---|---|---|---|---|---|---|---|---|---|---|---|---|---|---|
| | | | | | | | | | | | | | | | | | | | | | | | WEP | 83.25 |
| | | | | | | | | | | | | | | | | | | | | | | | WW | 2.85 |
| | | | | | | | | | | | | | | | | | | | | | | | WTP | 0.20 |
| Wtape | WEdge GB | WSBG Drv | WSBG Media | WDBG | NCH | NE | | | | | | | | NCH | NE | WS | | | | | | | NTrk | 402 |
| | | | | | | | | | | | | | | | | | | | | | | | NE | 32 |
| | | | | | | | | | | | | | | | | | | | | | | | NDB | 4 |
| | | | | | | | | | | | | | | | | | | | | | | | NtrkAll | 51456 |
| um | um | um | um | um | # | # | | | | | | | | # | # | um | | | | | | | NTrkAll | NTrk Design |
| 12650 | 560 | 5.863 | 2 | 3 | 64 | 64 | | | | | | | | 64 | 64 | 2 | | | | | | | um | # |
| Pisa deg | Nservo Per SB # | NDB # | NE # | NCH # | WDBG um | WOutBuf um | WW um | WmBuf um | WEP um | WSELong um | WSEShort um | Head um | Tape um | WTP um | WDB um | WSB Range um | WSB Spec um | NTrk # | NTrkAll um | NTrk Design # |
|---|---|---|---|---|---|---|---|---|---|---|---|---|---|---|---|---|---|---|---|---|
| 0 | 1 | 4 | 64 | 64 | 3 | 0.25 | 0.5 | 0.25 | 43.753 | 55.391 | 55.391 | 2867.243 | 2867.243 | 0.200 | 2800.210 | 45.303 | 57.029 | 214 | 54784 | 214 |
| 0 | 1 | 4 | 64 | 64 | 3 | | 1 | | 43.753 | 55.391 | 55.391 | 2867.243 | 2867.243 | 0.200 | 2800.210 | 45.303 | 57.029 | 212 | 54272 | 212 |
| 0 | 1 | 4 | 64 | 64 | 3 | | 2.85 | | 43.753 | 55.391 | 55.391 | 2867.243 | 2867.243 | 0.200 | 2800.210 | 45.303 | 57.029 | 202 | 51712 | 202 |
| 0 | 1 | 4 | 64 | 64 | 3 | | 10 | | 43.753 | 55.391 | 55.391 | 2867.243 | 2867.243 | 0.200 | 2800.210 | 45.303 | 57.029 | 166 | 42496 | 166 |
| 0 | 2 | 4 | 32 | 64 | 3 | | 0.5 | | 87.507 | 99.146 | 55.392 | 2867.242 | 2867.242 | 0.200 | 2800.210 | 45.303 | 57.031 | 432 | 55296 | 432 |
| 0 | 2 | 4 | 32 | 64 | 3 | | 1 | | 87.507 | 99.146 | 55.392 | 2867.242 | 2867.242 | 0.200 | 2800.210 | 45.303 | 57.031 | 430 | 55040 | 430 |
| 0 | 2 | 4 | 32 | 64 | 3 | | 2.85 | | 87.507 | 99.146 | 55.392 | 2867.242 | 2867.242 | 0.200 | 2800.210 | 45.303 | 57.031 | 420 | 53760 | 420 |
| 0 | 2 | 4 | 32 | 64 | 3 | | 10 | | 87.507 | 99.146 | 55.392 | 2867.242 | 2867.242 | 0.200 | 2800.210 | 45.303 | 57.031 | 386 | 49408 | 386 |
| 10 | 1 | 4 | 64 | 64 | 3 | | 0.5 | | 44.429 | 56.231 | 56.231 | 2911.482 | 2867.250 | 0.200 | 2800.250 | 45.274 | 57.000 | 214 | 54784 | 214 |
| 10 | 1 | 4 | 64 | 64 | 3 | | 1 | | 44.429 | 56.231 | 56.231 | 2911.482 | 2867.250 | 0.200 | 2800.250 | 45.274 | 57.000 | 212 | 54272 | 212 |
| 10 | 1 | 4 | 64 | 64 | 3 | | 2.85 | | 44.429 | 56.231 | 56.231 | 2911.482 | 2867.250 | 0.200 | 2800.250 | 45.274 | 57.000 | 212 | 54272 | 212 |
| 1DB, 64CH 10 | 1 | 4 | 64 | 64 | 3 | | 10 | | 44.429 | 56.231 | 56.231 | 2911.482 | 2867.250 | 0.200 | 2800.250 | 45.274 | 57.000 | 168 | 43008 | 168 |
| 10 | 2 | 4 | 32 | 32 | 3 | | 0.5 | | 88.858 | 100.661 | 56.232 | 2911.482 | 2867.250 | 0.200 | 2800.250 | 45.273 | 57.001 | 432 | 55296 | 432 |
| 10 | 2 | 4 | 32 | 32 | 3 | | 1 | | 88.858 | 100.661 | 56.232 | 2911.482 | 2867.250 | 0.200 | 2800.250 | 45.273 | 57.001 | 430 | 55040 | 430 |
| 10 | 2 | 4 | 32 | 32 | 3 | | 2.85 | | 88.858 | 100.661 | 56.232 | 2911.482 | 2867.250 | 0.200 | 2800.250 | 45.273 | 57.001 | 422 | 54016 | 422 |
| 1DB, 32CH 10 | 2 | 4 | 32 | 32 | 3 | | 10 | | 88.858 | 100.661 | 56.232 | 2911.482 | 2867.250 | 0.200 | 2800.250 | 45.273 | 57.001 | 386 | 49408 | 386 |

FIG. 7

TAPE HEAD WAFER DESIGN FOR MULTIPLE FORMATS USING SAME TAPE

BACKGROUND

Embodiments of the present disclosure relate to data storage, and more specifically, to tape head wafer designs suitable for multiple formats using the same tape.

BRIEF SUMMARY

According to embodiments of the present disclosure, a tape head adapted to 32-, 64-channel operation is provided. A plurality of elements numbering $N_E$ is provided, comprising 64 evenly-spaced elements, comprising at least a first element, a last element, and a second-to-last element. A plurality of servos is provided, comprising at least a first through fourth servo. the 64 evenly-spaced elements of each set are separated by an element pitch ($W_{EP}$). The first element and the first servo are separated by a first distance ($W_{SE.Long}$). The first element and the second servo are separated by a second distance ($W_{SE.Short}$). The second-to-last element and the third servo are separate by the second distance ($W_{SE.Short}$). The last element and the fourth servo are separate by the second distance ($W_{SE.Short}$). The first servo and the third servo are separated by a third distance equal to $2 \cdot W_{SE.Short} + (N_E - 1) \cdot W_{EP64}$, wherein $W_{EP64} = W_{EP}$, and the second servo and the fourth servo are separated by the third distance.

According to embodiments of the present disclosure, a tape head adapted to 32-, 64-, and 128-channel operation is provided. A plurality of elements numbering $N_E$ is provided, comprising first and second sets of 64 evenly-spaced elements, each set comprising at least a first element, a last element, and a second-to-last element. A plurality of servos is provided, comprising at least a first through sixth servo. The 64 evenly-spaced elements of each set are separated by an element pitch ($W_{EP}$). The first element of the first set and the first servo are separated by a first distance ($W_{SE.Long}$). The first element of the first set and the second servo are separated by a second distance ($W_{SE.Short}$). The second-to-last element of the first set and the third servo are separate by the second distance ($W_{SE.Short}$). The last element of the first set and the fourth servo are separate by the second distance ($W_{SE.Short}$). The first element of second set and the third servo are separate by the first distance ($W_{SE.Long}$). The first element of second set and the fourth servo are separate by the second distance ($W_{SE.Short}$). The second-to-last element of the second set and the fifth servo are separate by the second distance ($W_{SE.Short}$). The last element of the second set and the sixth servo are separate by the second distance ($W_{SE.Short}$). The first servo and the third servo are separated by a third distance equal to $2 \cdot W_{SE.Short} + (N_E - 1) \cdot W_{EP64}$, wherein $W_{EP64} = W_{EP}$. The second servo and the fourth servo are separated by the third distance. The third servo and the fifth servo are separated by the third distance. The fourth servo and the sixth servo are separated by the third distance.

According to embodiments of the present disclosure, a method of accessing a tape medium is provided. A tape medium is received at a tape head as set forth above. The tape medium has a plurality of servo bands. Each of the plurality of servo bands is aligned to at least one of the plurality of elements of the tape head.

BRIEF DESCRIPTION OF THE SEVERAL VIEWS OF THE DRAWINGS

FIG. 7 is a table showing optimization for various designs to determine $W_{EP}$, $W_{SE.Short}$ and $W_{SE.Long}$ versus writer width, $W_W$, $N_{ServoPerSB}$, and the tilt angle, "Pisa" of 0 or 10 degrees at $W_{TP}$=200 nm according to embodiments of the present disclosure.

DETAILED DESCRIPTION

Figure 1:
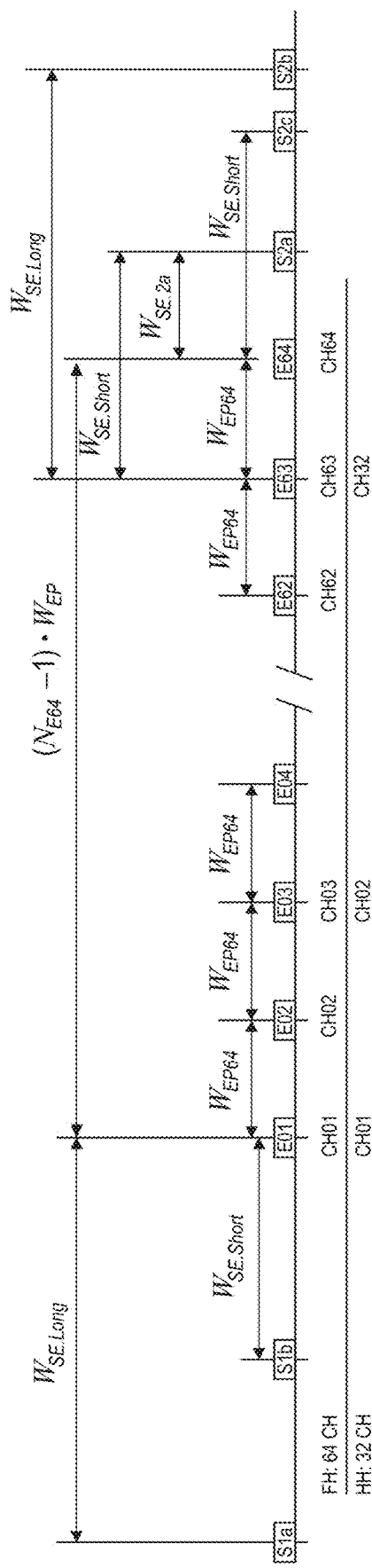
FIG. 1 is a schematic of a dual use 1 DB, 64 CH and 32 CH Tape head module according to embodiments of the present disclosure.

Various Tape drives for large scale data storage use Read/Write heads with multiple Readers and Writers and Servo elements used to determine the position on the tape for reading and writing. The Tape is segmented into $N_{DB}$ data bands, DB, of width $W_{DB}$, $N_{SB}=N_{DB}+1$ servo bands, SB, of width $W_{SB}$, and two Edge Bands, EB of width, $W_{Edge}$. The Data is written in the DBs by the $N_E$ Writer Elements and read back with the $N_E$ Reader Elements. The servos in the servo band are used to read the servo patterns and determine the lateral location of the heads on the tape.

In various systems, the head design is symmetric and has an even number of servos within the read/write head. For a product, the head and media must be tailored to match with high tolerances. For example the head span (distance between servos straddling a data band) is precisely defined and must match the servo band span on the tape (distance between two servo bands straddling a data band). Utilizing a single wafer head design and single Tape media for two distinct product design points is highly advantageous. The time to build and develop a wafer head design is several years and millions of dollars, as is the time to develop a paired media. Designing a wafer which can be used in multiple products is highly cost effective.

The present disclosure describes methods to build a single wafer for multiple products. A wafer design is provided that will function for at least 3 distinct product designs which include 32, 64 or 128 channels, CH. The 64 CH design can be used either as placing all 64 CH in a single DB or 32 CH each in two DB.

This following description discloses a wafer design which will work for multiple product designs: 1 DB with either 64 Channels, CH, or 32 CH, 2 DB with either 64 CH or 32 CH, and 128 CH in 2 DB. To achieve the first two designs, 1 DB with 64 and 32 CH an odd number of servos is used. The design uses 64 Elements all evenly spaced and five, 5, servos. Take the number of elements, $N_E$, spaced at an element pitch, $W_{EP}$. Place one servo in each servo band, one, $S_{1b}$, a distance, $W_{SE.Short}$ from element 1 and the second servo, $S_{2c}$, the same distance from element $N_E$. The distance between the two servos, $W_{Span64}$, is:

$$W_{Span64} = 2 \cdot W_{SE.Short} + (N_E - 1) \cdot W_{EP64} \cdot W_{EP64} \equiv W_{EP} \cdot 1b \quad \text{1a}$$

The media will be defined to have the spacing between the servo bands, $W_{SpanServo}$, to be equal in distance to the head span:

$$W_{SpanServo}=W_{Span64}. \quad 2$$

To efficiently write data tracks within the data band, an element will move horizontally a distance of approximately the element pitch minus the writer width, the width of the servo band will be to first order $W_{EP}$, so $W_{SE.Short}$ will be $\sim W_{EP}$.

To make the 32 CH version, the odd 32 elements, 1, 3, . . . , 63 will be used. The element pitch for the 32 tracks, $W_{EP32}$, will be 2× the fundamental 64 channel element pitch:

$$W_{EP32}=2 \cdot W_{EP64}. \quad 3$$

Thus, the elements in the 32 CH design will need to move horizontally 2× the distance which the elements in the 64 CH design moved. To achieve this, the 32 CH design requires 2 servos per servo band. The first servo for the 64 CH design, $S_{1b}$, can be used for both designs. A second servo in the first servo band, $S_{1a}$, will be placed a distance, $S_{SE.Long}$, from Element 1, which is common for both 64 and 32 CH designs. The 32 CH design will require two servos, $S_{2a}$ and $S_{sb}$, located a distance $S_{SE.Short}$ and $S_{SE.Long}$ from the last element in the 32 CH design. The $32^{nd}$ element in the 32 CH design is element 63 in the 64 CH design. Thus $S_{2a}$ will be unique from $S_{2c}$. To utilize the same tape, the 32 CH head span must equal to the 64 CH head span:

$$W_{Span32}=W_{SE.Short}+W_{SE.Short}+(N_{E32}-1) \cdot W_{EP32}. \quad 4a$$

Inserting Equation 3 into 4a and the fact that $N_{E32}=N_E/2$ $$W_{Span32}=W_{SE.Short}+(N_E-1) \cdot W_{EP64}+W_{SE.Long}-W_{EP64}. \quad 4b$$

From Equation 1, $$W_{Span32}=W_{Span64}+W_{SE.Long}-W_{SE.Short}-W_{EP64}. \quad 4c$$

In order to have the two head spans equal:

$$W_{Span32}=W_{Span64}, \quad 5a$$

Requires the value of $W_{SE.Long}$ to be:

$$W_{SE.Long} = W_{SE.Short} + W_{EP64} = W_{SE.Short} + W_{EP32}/2. \quad 5b$$

This value for $W_{SE.Long}$ happens to be very close to the calculated value for the ideal case, and so the design will function with only a slight deviation from the ideal. In the case of the 32 CH design, the servo pairs $S_{1a}$ and $S_{2a}$ or $S_{1b}$ and $S_{2b}$ move while writing data is half the 32 CH element pitch or $W_{EP}$, then the servo locations will function. For the 1 DB, 64 CH mode, two servos are needed: one outside of E01, S1c, and a second outside of E64, S2c. The separation between S1c and E01 is $W_{SE.Short}$, which is the same separation between S1b and E01, so an additional servo, S1c is not needed as S1b serves that purpose. A second servo, S1c, is a distance $W_{SE.Short}$ outside E64, which is a distance $W_{EP64}$ from E63. Thus S1c is the same distance from E63 as is S1b so no additional servo is needed.

Referring to FIG. 1, a schematic of a dual use 64 CH and 32 CH Tape head module is provided. The elements, E01 to E64 can be Reader or Writer elements. In a 3-bump head design with a left writer, LW, a center reader, CR and a right writer, RW, they're arranged as LW, CR, RW. The modules are symmetric about rotation about the center of either the 32 or the 64 CH designs. The 64 CH design is symmetric about the mid-point between elements 32 and 33. The relationship between the 32 CH element, $N_{CH.32}$, and the 64 CH element, $N_{CH.64}$, is:

$$N_{CH.32} = \frac{(N_{CH.64} - 1)}{2} + 1. \quad 7a$$

or $$N_{CH.64} = 2 \cdot N_{CH.32} - 1. \quad 7b$$

The 32 CH design is symmetric about the mid-point between 32 CH elements 16 and 17, or 64 CH element 32.

64 CH operation: For the 64 CH operation, elements E01 to E64 are connected to channels CH01 to CH64 and utilized. Servos S1b and S2c are utilized.

32 CH operation: For the 32 CH operation, 32 odd elements, E01, E03, . . . E61 and E63 are connected up to channels CH01 to CH32 and utilized. Servos S1a and S2a are utilized to write to the "top" of the data band and Servos S1b and S2b are utilized to write to the "bottom" of the data band.

Figure 2:
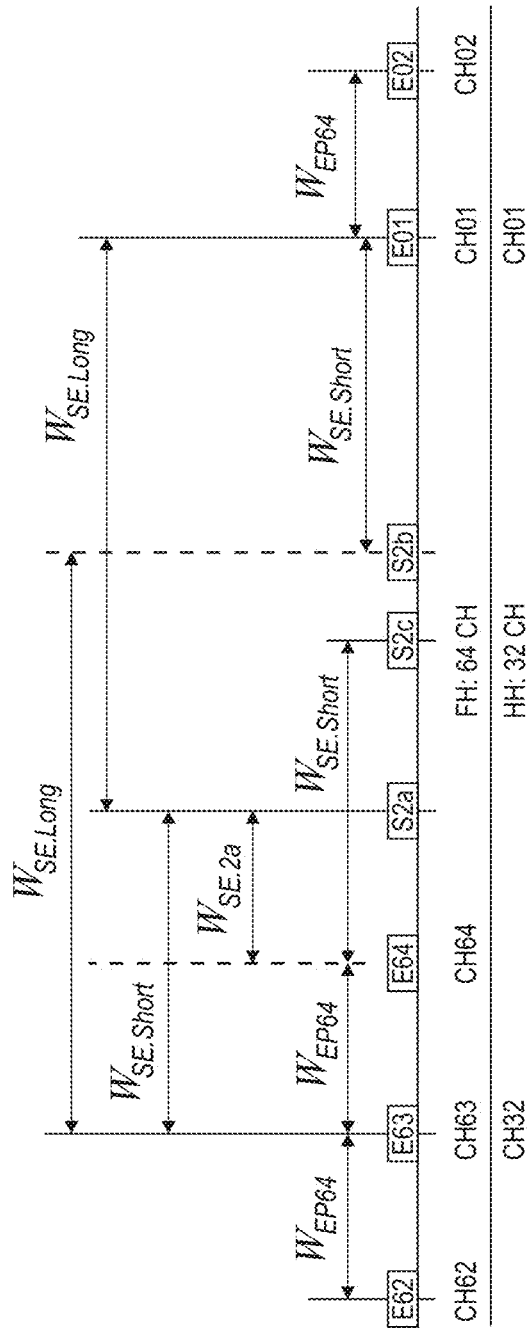
FIG. 2 is a schematic of the location of servos S2a, S2c, S2b between Group1, E63 & 64 and Group2 E01 and E02: LSa, LSb and LSc according to embodiments of the present disclosure.

FIG. 2a is a schematic of a 2 DB, 64 CH and 1 DB 32 CH Mode module and 2b is a blow up of the design. The HH: 32 CH are the elements used (E01, E03, . . . , E61, E64). The design is created by duplicating the 1 DB, 64 CH and 32 CH design. The 1 DB, 32 CH becomes the 2 DB 64 CH design. Defining the distances relative to E63 as LS2n, where n=a, b or c. By definition, $$LS2a = W_{SE.Short}, \text{ and} \qquad 8a$$

$$LS2c = W_{EP64} + W_{SE.Short}, \qquad 8b$$

$$\text{and } LS2b = W_{SE.Long}. \qquad 8c$$

inserting $W_{SE.Long}$ from 5b into 8c:

$$LS2b = W_{SE.Long} = W_{EP64} + W_{SE.Short}. \qquad 8d$$

The right-hand side of Equations 8b and 8d are the same, so:

$$LS2c = LS2b. \qquad 8e$$

Thus the design is fully symmetric: S1a, S1b, E01, E02, . . . , E63, E64, S2a, S2b.

Figure 3:
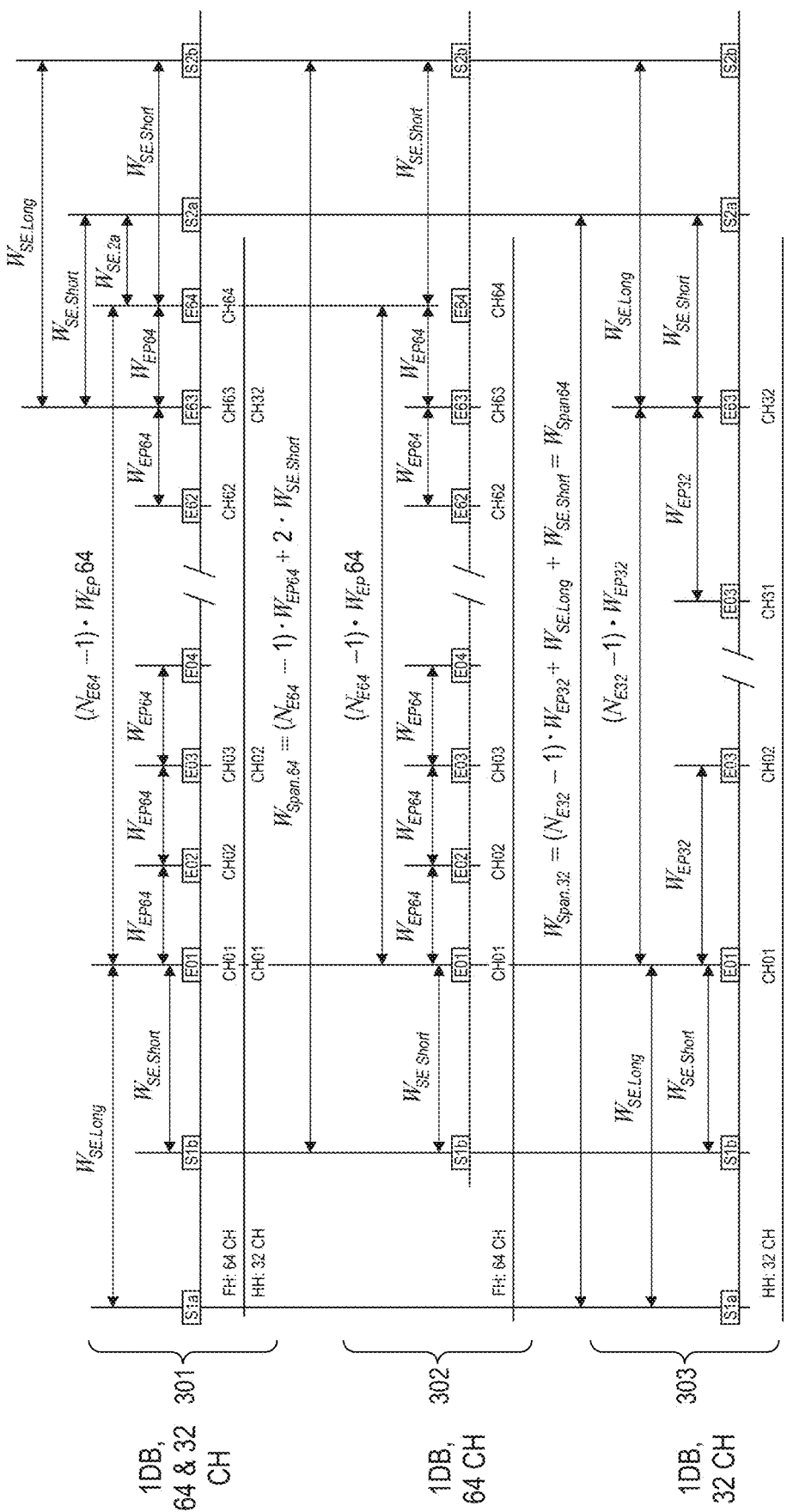
FIG. 3 is a schematic of a dual use 1 DB, 64 CH and 32 CH Tape head module, illustrating a full design layout, 64 CH portion, and 32 CH portion according to embodiments of the present disclosure.

FIG. 3 is a schematic of the dual use 1 DB, 64 CH and 32 CH Tape head module. Section 301 replaces the design in FIG. 1, removing S2c, since S2c and S2b are the same servos. Thus, the design is fully symmetric. Section 301 is the complete design layout, including servos S1a, S1b, S2a, S2b and elements E01 to E64. Section 302 displays only the 64 CH portion, which removes servos S1a and S2a. Section 303 displays only the 32 CH portion, which includes all the servos, S1a, S1b, S2a and S2b and the 32 odd elements, E01, E03, . . . , E61 and E63.

Figure 4:
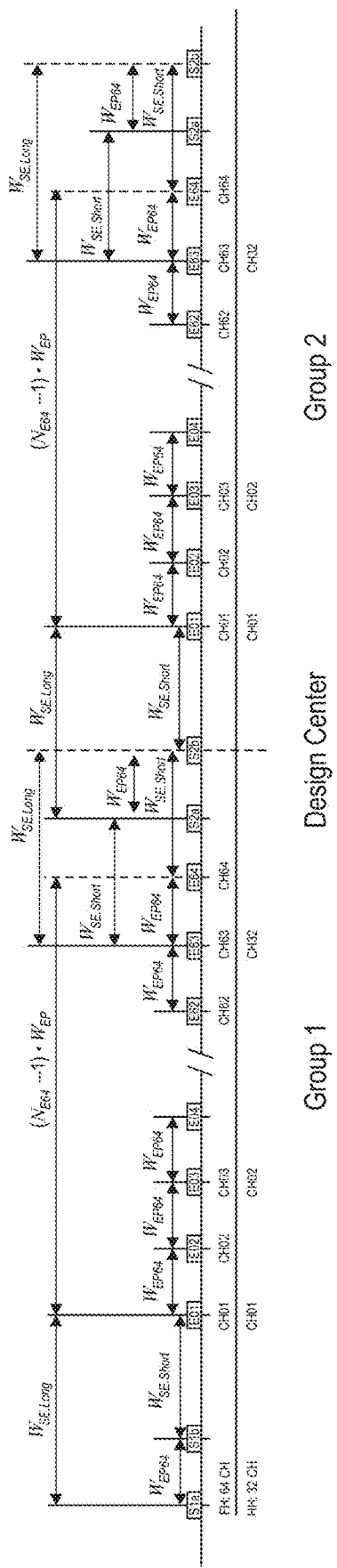
FIG. 4 is a schematic of a multi-use: {1 DB, 128 CH}, {1 DB, 64 CH}, {2 DB 64 CH}, {1 DB 32 CH} Tape head module according to embodiments of the present disclosure.

FIG. 4 is a schematic of a fully symmetric wafer design for a 2 DB, 64 CH and 1 DB 32 CH Mode module. The 32 CH mode uses elements (E01, E03, . . . , E61, E64) and servos S1a and S2a for half the data bands, referred to as the "Top" half, and S1b and S2b for the second, "Bottom" half A 2 DB version is created by duplicating the 1 DB, 64 CH design, calling the left DB Group1 and the right DB Group 2 and relabeling S1a and S1b from Group 1 as S2a and S2b of Group2 and S2a and S2b of Group 1 as S3a and S3b of Group 2. Group2 S2a and S2b are actually the same as Group 1 S2a and S2b. This layout will now work for a 1 DB 32 CH mode, a 2 DB 64 CH mode (32 CH from Group 1 and 32 CH from Group 2) and a 2 DB, 128 design with 64 CH in Group1 and 64 CH in Group 2. The concepts are the same as describe earlier, except 2 DBs and 3 SBs are utilized. The symmetry point for the 2 DB 64 CH and 2 DB 128 designs is the servo, S2b. The 1 DB, 32 CH is same as described earlier, but either group could be used. The 2 DB, 64 CH design will use 2 servos each in 3 SBs: ({S1a, S2a}, {S1b, S2b}, and {S3a, S3b}).

Figure 5:
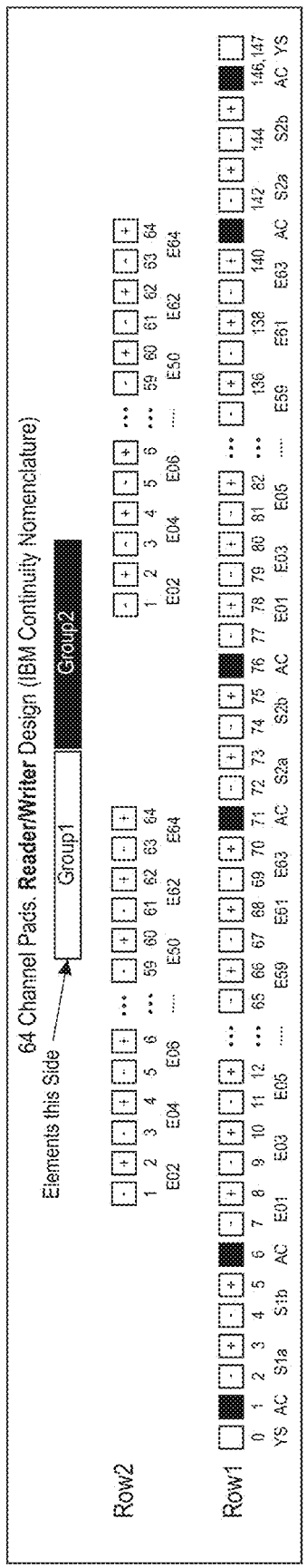
FIG. 5 is a pad diagram for {2 DB, 64 CH, 1 DB, 32 CH} and {1 DB, 64 CH and 32 CH} designs according to embodiments of the present disclosure.

FIG. 5 is schematic of the pad diagram for the {2 DB, 64 CH, 1 DB, 32 CH} and {1 DB, 64 CH and 32 CH} designs. Row 2 is used for the 2 DB, 64 CH, 1 DB, 32 CH design. The 2 DB, 64 CH design uses servos S1a, S1b, S2a, S2b, S3a and S3b and Elements E01, E03, . . . E61 and E63. AC and YS are extra pads and irrelevant for the discussion. S2c and S3c are not used. The 1 DB, 32 CH design uses Row2 pads and has two choices: (a) servos S1a, S1b, S2a and S2b and elements E01, E03, . . . E61 and E63 from Group 1; (b) servos S2a, S2b, S3a and S3b and elements E01, E03, . . . E61 and E63 from Group 2. For the 1 DB, 32 CH and 2 DB, 64 CH options, Row 2 is irrelevant. Row 2 can be used for a 2 DB, 128 CH product.

The 1 DB, 64 CH design has two options: (a) servos S1b and S2c and Row 2, Group 1 elements E01, E03, . . . , E61 and E63 and Row 1, Group 1 elements E02, E04, . . . , E62 and E64; (b) servos S2b and S3c and Row 2, Group 2 elements E01, E03, . . . , E61 and E63 and Row 1, Group 2 elements E02, E04, . . . , E62 and E64.

Figure 6:
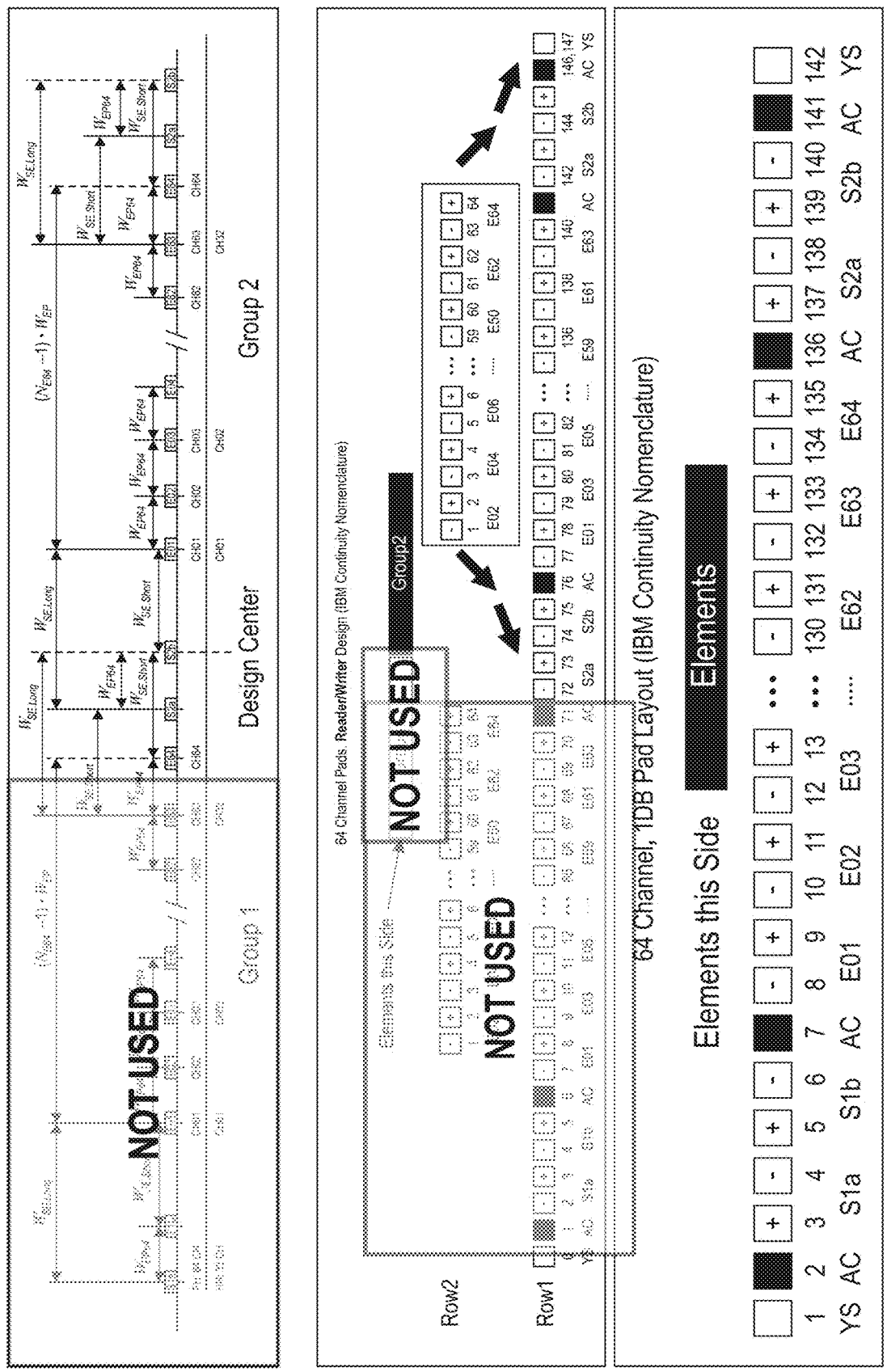
FIG. 6 illustrates a pad conversion to convert to the 1 DB, 64 and 32 CH design according to embodiments of the present disclosure.

If it's preferable to have the 1 DB, 64 CH design in one row, one could redo the lead and pad masks to put all elements in a single row. This process is relatively inexpensive since all the element designs do not need to be repeated. FIG. 6 shows the pad conversion to convert to the 1 DB, 64 and 32 CH design.

FIG. 7 is a table of the optimization parameters $W_{EP}$, $W_{SE.Short}$ and $W_{SE.Long}$ versus writer width, $W_W$, $N_{ServoPerSB}$, and the tilt angle, "Pisa" of 0 or 10 degrees with $W_{TP}$=200 nm. The other parameters, such as buffers and tape width are all the same. Focusing on the 1 DB, 64 CH and 1 DB, 32 CH designs have the same value for $W_{SE.Short}$. The value of $W_{SE.Long}$ agrees with Equation 5b. Rounding all values to 10 nm, $W_{EP64}$=43.43 µm, and $$W_{EP32} = 2 \cdot W_{EP64} = 88.86 \ \mu m \cdot W_{SE.Short} =$$
$$56.23 \ \mu m \text{ and } W_{EP32}/2 = W_{EP64} = 43.43 \ \mu m \cdot W_{SE.Short} + W_{EP32}/2 =$$
$$100.66 \ \mu m,$$

which is the value for $W_{SE.Long}$, as required by Equation 5b.

Figure 8:
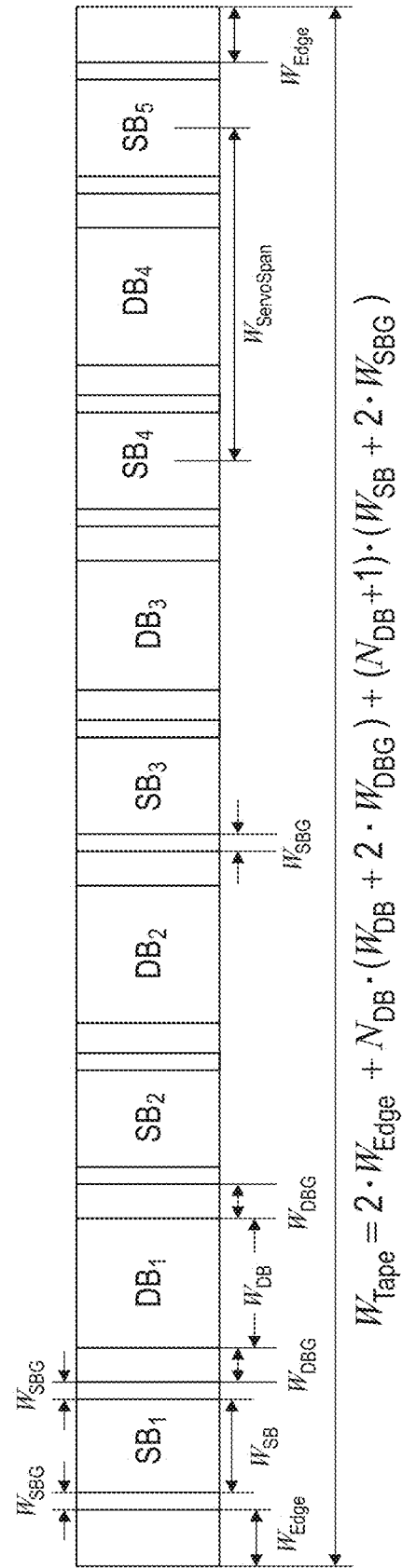
FIG. 8 is a schematic description of the regions on tape according to embodiments of the present disclosure.

FIG. 8 shows the regions on Tape. Two edge guard bands, each of width $W_{Edge}$, are show, one on either end of the tape. No magnetic information is written in these regions. This is a 4 data band tape format ($N_{DB}$=4), labeled $DB_1$ to $DB_4$, each of width $W_{DB}$, and 5 servo bands, labeled $SB_1$ to $SB_5$, and each of width $W_{SB}$. The servos are designed to span the servo band while writing data within each data band. A buffer is located at either end of a data band (Data Band Guard) of width $W_{DBG}$ and on either end of the servo band (Servo Band Guard) of width $W_{SBG}$. The width of tape is given by:

$$W_{Tape}=2 \cdot W_{Edge}+N_{DB} \cdot (W_{DB}+2 \cdot W_{DBG})+(N_{DB}+1) \cdot (W_{SB}+2 \cdot W_{SBG}). \qquad 1$$

The Servo and Data band guards, which act as buffers between the Servo Bands and the Data Bands respectively to avoid overwriting these regions. Note that the parameter $W_{DBG}$ is not strictly needed as it can be accounted for by modifying $W_{SBG}$ and $W_{Edge}$. The benefit of $W_{DBG}$ is if one chooses to define media with $W_{SBG}$ for the media and then add a drive protection of $W_{DBG}$, then the Media and the head can account for the buffers differently. However, for claims, it is not necessary to include $W_{DBG}$:
{$W_{SBG2}$, $W_{Edge2}$ and $W_{DBG2}$=0} with $W_{SBG2}$=$W_{SBG1}$+$W_{DBG1}$, $W_{Edge2}$=$W_{Edge1}$−$W_{DBG1}$. gives equivalent results to {$W_{SBG1}$, $W_{DBG1}$, $W_{Edge1}$≠0}.

In the description of writing, Data is written Top-to-Bottom of data band for Forward or Even Wraps and Bottom-to-Top for Reverse or Odd wraps. Forward and Even are interchangeable as are Reverse and Odd Wraps.

Figure 9:
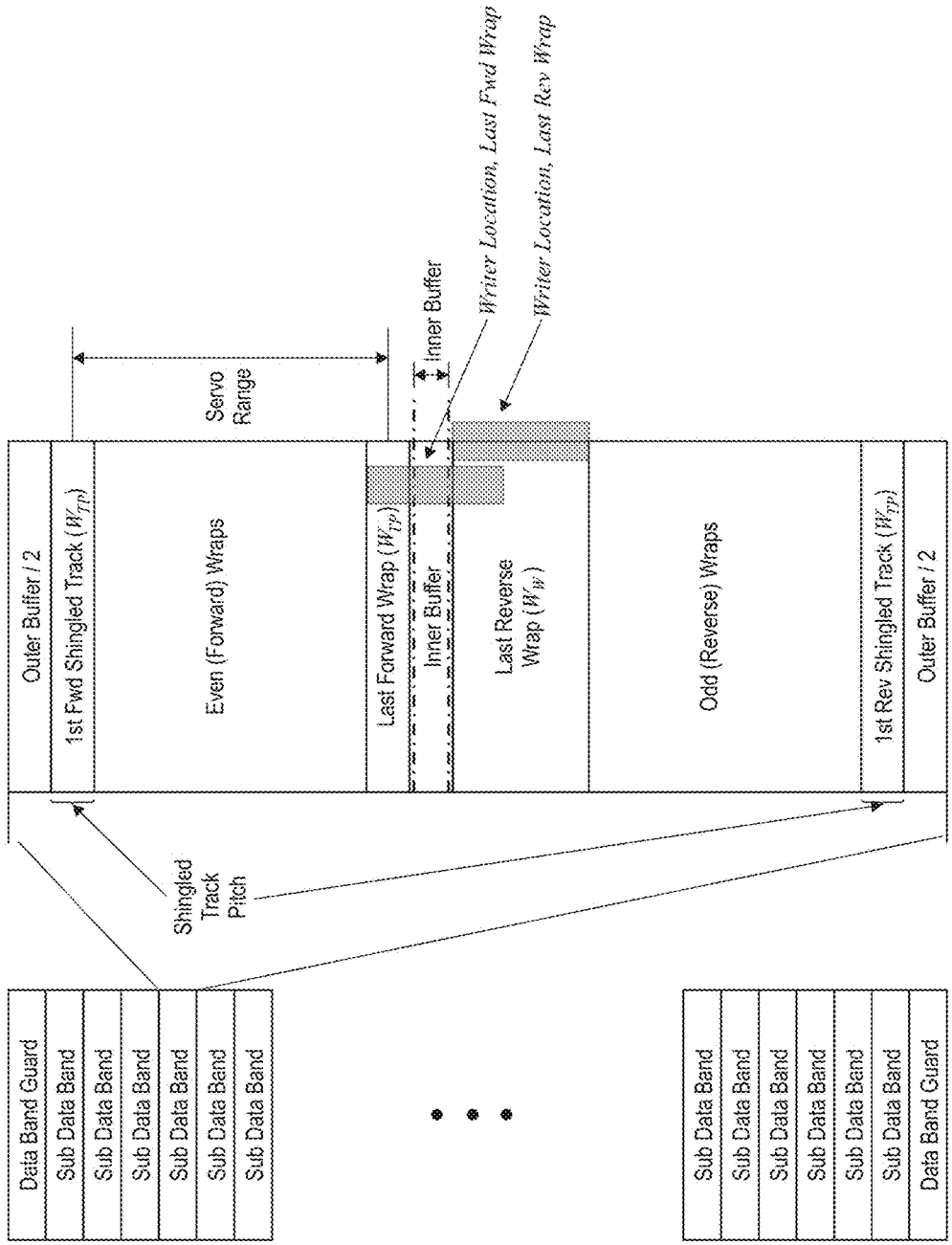
FIG. 9 illustrates data band and sub-data band composition according to embodiments of the present disclosure.

Referring to FIG. 9, a schematic of a Data Band (DB) and Sub Data Bands, SDB is provided. The data band is surrounded by two Data Guard Bands, each of width, $W_{DBG}$, which acts as buffers between the data band and the surrounding Servo Bands. For a Tape Head with $N_E$ Read and $N_E$ Write elements and a drive with $N_{CH}$ Read/Write channels, where $N_E = N_{CH}$, the number of sub data bands is $N_E$. On the Read and Writer modules, the Elements (Readers or Writers) are all separated by an element pitch of width, $W_{EP}$. The width of the Data Band, $W_{DB}$, then is given by the number of elements times the element pitch:

$$W_{DB} = N_E \cdot W_{EP}. \qquad 10$$

Each SDB has an Outer Buffer on either end with the width, $W_{OutBuf}/2$. The data is written from the top of the SDB to the center on Forward Wraps and from the bottom of the SDB to the center on Reverse Wraps. An Inner buffer of width, $W_{InBuf}$, separates the last forward track from the last reverse track.

A total of $N_{trk}$ Wraps (or tracks) will be written. Half will be in the Even (Forward) Wraps and half will be in the Odd (Reverse) Wraps. In this document, Even and Forward are interchangeable as are Odd and Reverse. Forward and Reverse, simply indicate directions of tape motion. These terms are also interchangeable in practice. For the first Even Wrap, the writer top edge abuts the lower edge of the top Outer Buffer. The data is shingled to a Track Pitch width, $W_{TP}$. The width of the Even Wrap data region within the SDB will be $W_{TP} \cdot N_{trk}/2$. So, the writer will move a distance, $W_{mv}$, given by:

$$W_{mv} = \left(\frac{N_{trk}}{2} - 1\right) \cdot W_{TP}. \qquad 11$$

An Inner Buffer of width $W_{InBuf}$ is located between the Even and Odd Wraps region to ensure that the data is not overwritten by the last Even or Odd Written track. The bottom of the final shingled track for the Even Wraps abuts the top of the Inner Buffer. For the first Odd Wrap, the bottom of the writer abuts the top of the Outer Buffer at the bottom of the SDB. For the final Odd Wrap, the top of the writer will be positioned at or slightly below the bottom of the Inner Buffer. This is to ensure that no data is overwritten. The width of the final Odd Wrap will then be the width of the Writer as it is not shingled. The Data Sub Band width is the Element Pitch, which is calculated using Equation 12a:

$$W_{EP} = (N_{TrkR} - 1) \cdot W_{TP} + W_W + W_{OutBuf} + W_{InBuf}. \qquad 12a$$

Solving for $N_{TrkR}$ gives:

$$N_{TrkR} = \frac{W_{EP} - W_W - W_{InBuf} - W_{OutBuf} + W_{TP}}{W_{TP}} \qquad 12b$$

$N_{TrkR}$ is a real number. Physically, the number of Wraps an integer, $N_{Trk}$. Since the number of Even and Odd wraps is the same, $N_{Trk}$ is and even integer;

and $N_{Trk} = 2 \cdot \text{float}(N_{TrkR}/2)$, \qquad 12c $$N_{Trk} = 2 \cdot \text{floor}\left(\frac{W_{EP} - W_W - W_{InBuf} - W_{OutBuf} + W_{TP}}{2W_{TP}}\right). \qquad 12d$$

floor(x) is the mathematical function which rounds down to the nearest integer.

Since the buffers are much smaller than $W_{EP}$ and $W_W$, $N_{Trk}$ is primarily given by $W_{EP} - W_W$, so the wider the writer, the lower the capacity.

$$N_{Trk} \sim \frac{W_{EP} - W_W}{W_{TP}} + 1 \qquad 12e$$

The next step is to determine the required width of the servo bands. Two options for servos will be discussed. The simplest is a single servo in each Servo Band (Single Servo Option). The second is using two separate servos, one to write the Even Wraps and a second to write the Odd Wraps (Dual Servo Option). The two will be discussed below.

Figure 10:
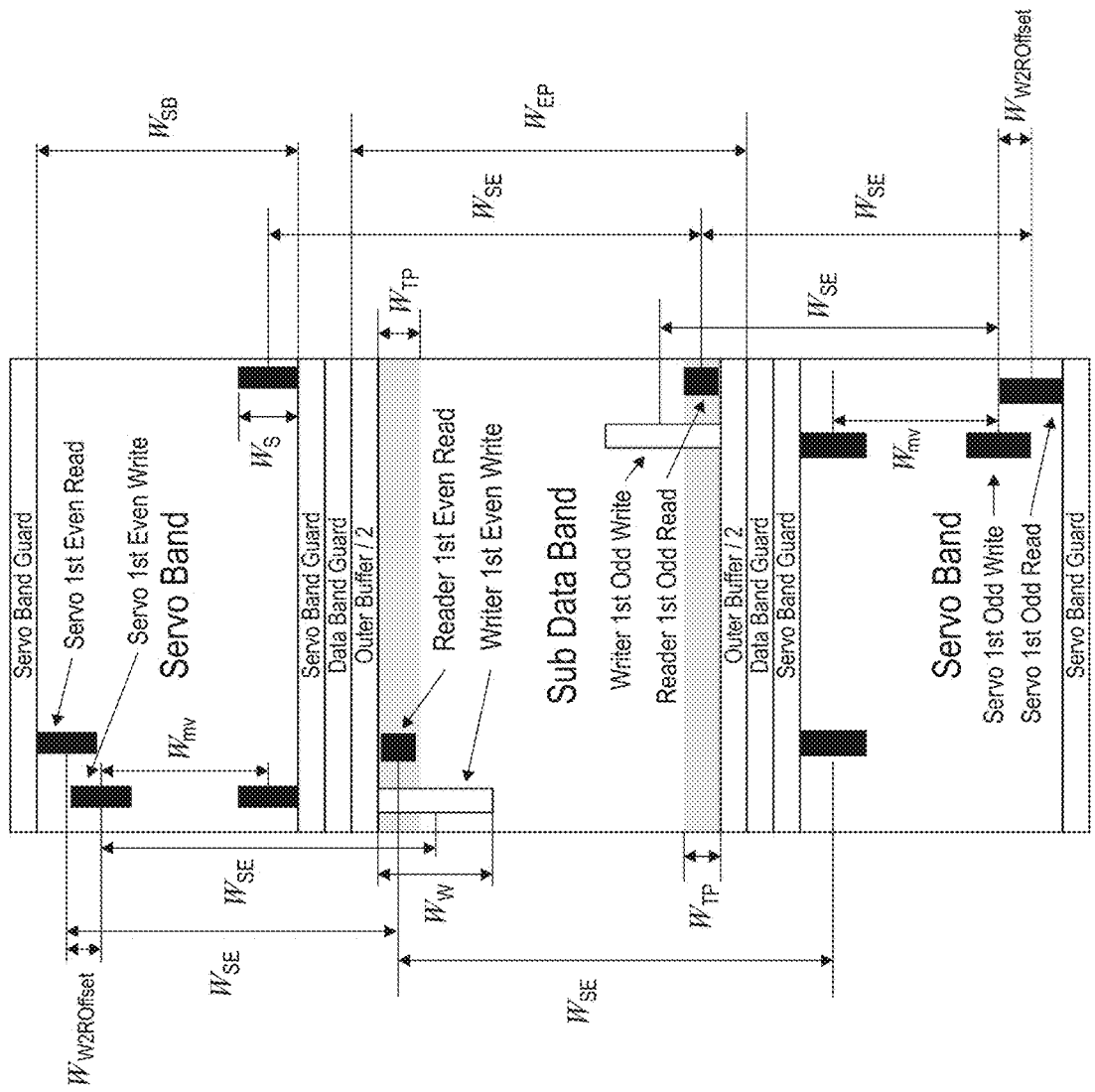
FIG. 10 is a schematic of the Servo Bands and a single Sub Data Band for Forward and Reverse Writing and Reading according to embodiments of the present disclosure.

Single Servo Option for $N_E = N_{CH}$. FIG. 10 is a schematic of two shows a schematic of two servo bands surrounding one Sub Data Bands in the case where $$N_E = N_{CH} = 1.$$

The concept can be expanded to any case where $N_E = N_{CH}$. FIG. 10 is sufficient to determine the servo-to-nearest element distance ($W_{SE}$ in FIG. 10) or the servo band width, $W_{SB}$, in FIG. 10 is sufficient for any $N_E$. For $N_E > 1$, the length of the Data Band Region is $W_{DB}$, given by Equation 10. Shown are the Top and Bottom servo bands with the servo guard band, the data guard bands, the data guard bands between the servo bands and the data band. Only a single SDB is shown since this is pictorially easier than showing all SDBs. For determining the required servo band width, and the separation between the servos and the nearest element, etc., this diagram is sufficient.

Using a single servo when the number of channels is equal to the number of elements, $N_{CH} = N_E$, the width of the Servo Band and the distance between the Servo and the nearest element, $W_{SE,EvenNE}$, (simply $W_{SE}$ in FIG. 8), can be explained using FIG. 10. The subscript "SE" indicates servo-to-element, and "EvenNE" indicates $N_E$ is an even number. Since the center of the reader is $$\frac{W_{TP} + W_{OutBuff}}{2}$$

from the top of the SDB for the $1^{st}$ Even Read wrap and from the bottom of the SDB for the $1^{st}$ Odd Read wrap, the Reader will move a distance:

$$W_{mv,R} = W_{EP} - W_{TP} - W_{OutBuf}. \qquad 13a$$

The Servo moves the same distance. The top edge of the servo abuts the top of the SB for the $1^{st}$ Even Read wrap and the bottom edge of the servo abuts the bottom edge of the SB for the $1^{st}$ Odd wrap so the center of the servo will be $W_S/2$ from the top and bottom edge of the SB for the $1^{st}$ Even and Odd wraps respectively. $W_S$ is the Servo width. Thus, the width of the Servo band will be:

$$W_{SB} = W_{mv,R} + 2 \cdot \frac{W_S}{2} = W_{EP} + W_S - W_{TP} - W_{OutBuff}. \qquad 13b$$

The distance between the center of the Top Servo and the center of the first $1^{st}$ Reader can be determined viewing FIG. 8 for the $1^{st}$ Even Read with the distance $W_{SE}$:

$$W_{SE} = W_{SB} - \frac{W_S}{2} + W_{SBG} + W_{DBG} + \frac{W_{OutBuff}}{2} + \frac{W_{TP}}{2}. \quad 14a$$

Combining 13b with 14a yields:

$$W_{SE} = W_{EP} + \frac{W_S - W_{TP} - W_{OutBuff}}{2} + W_{SBG} + W_{DBG} \cdot 14b$$

By symmetry, the distance from the Lower Servo to the last Reader will also be given by Equation 14b. Note that the actual width of the Data band is given by Equation 8 for $N_E$ Elements, but for explanation purposes a single SDB is sufficient and easier to show pictorially.

Equation 1 gives $W_{Tape}$ as a function of unknowns $W_{DB}$ and $W_{SB}$; Equations 10 and 13b respectively give $W_{DB}$ and $W_{SB}$ as a function of $W_{EP}$. Combining Equations 9, 10 and 13b solve for $W_{EP}$.

$$W_{EP} = \frac{W_{Tape} - 2 \cdot W_{Edge} - 2 \cdot N_{DB} \cdot W_{DBG} - (N_{DB} + 1) \cdot (W_s - W_{TP} - W_{OutBuff} + 2 \cdot W_{SBG})}{(N_{DB} \cdot N_E + N_{DB} + 1)}. \quad 15a$$

An approximation for $W_{EP}$ is:

$$W_{EP} \sim \frac{W_{Tape} - 2 \cdot W_{Edge}}{(N_{DB} N_E + N_{DB} + 1)}. \quad 15b$$

Error in 15b is ~300 nm.

$W_{SB}$ can be determined using Equation 13b using the value for $W_{EP}$ from Equation 15a.

The Servo-to-Servo span, $W_{ServoSpan.Even}$, is given by:

$$W_{ServoSpan.Even} = 2 \cdot W_{SE.EvenNE} + (N_E - 1) \cdot W_{EP}. \quad 16a$$

$$W_{ServoSpan.Even} = \quad 16b$$
$$(N_E + 1) \cdot W_{EP} + W_S - W_{TP} - W_{OutBuff} + 2 \cdot (W_{SBG} + W_{DBG}).$$

Thus, $W_{ServoSpan.Even} \sim (N_E+1) \cdot W_{EP} + W_S$. $\quad 16c$

Figure 11:
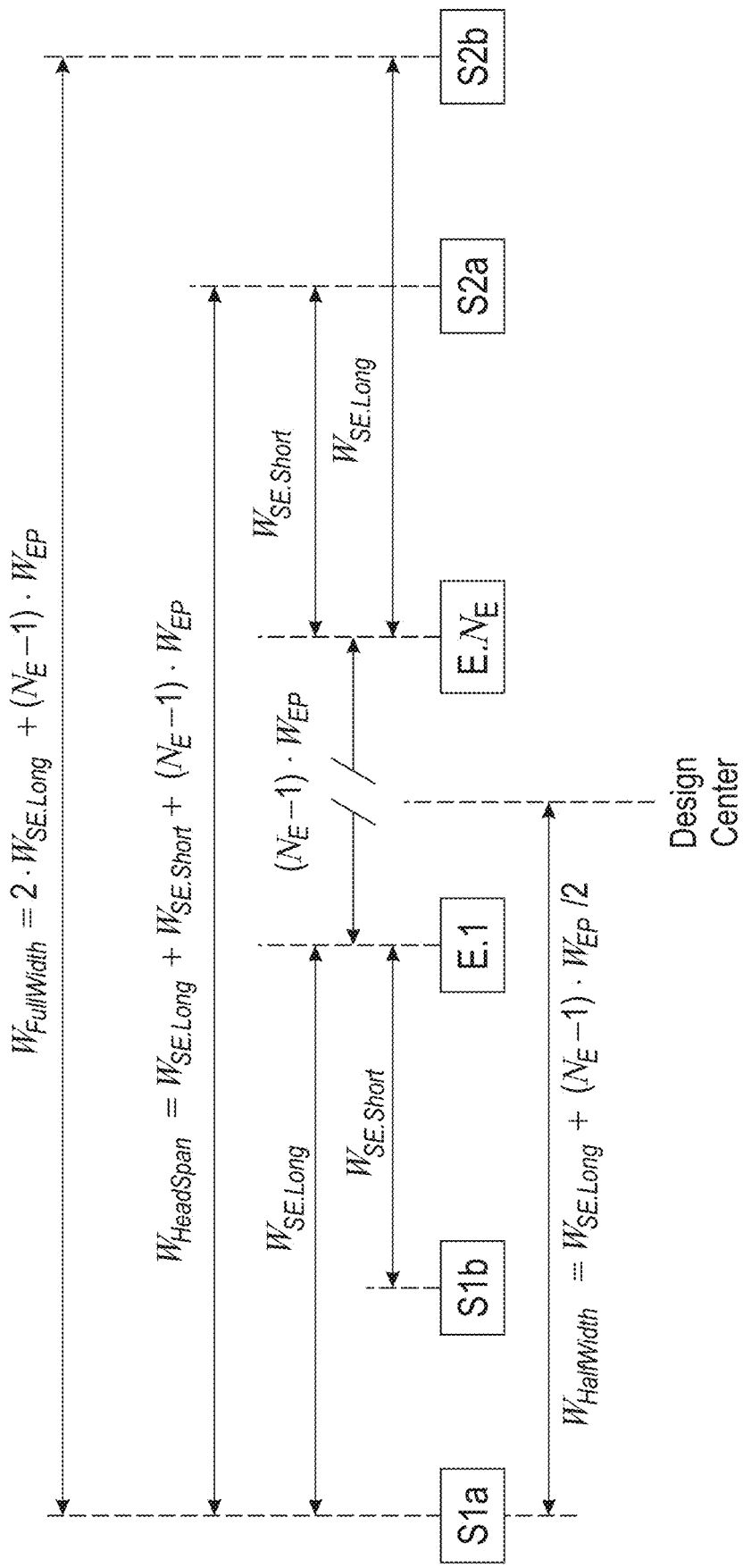
FIG. 11 is a schematic of a single band head with dual servos per servo band according to embodiments of the present disclosure.
Figure 12A:
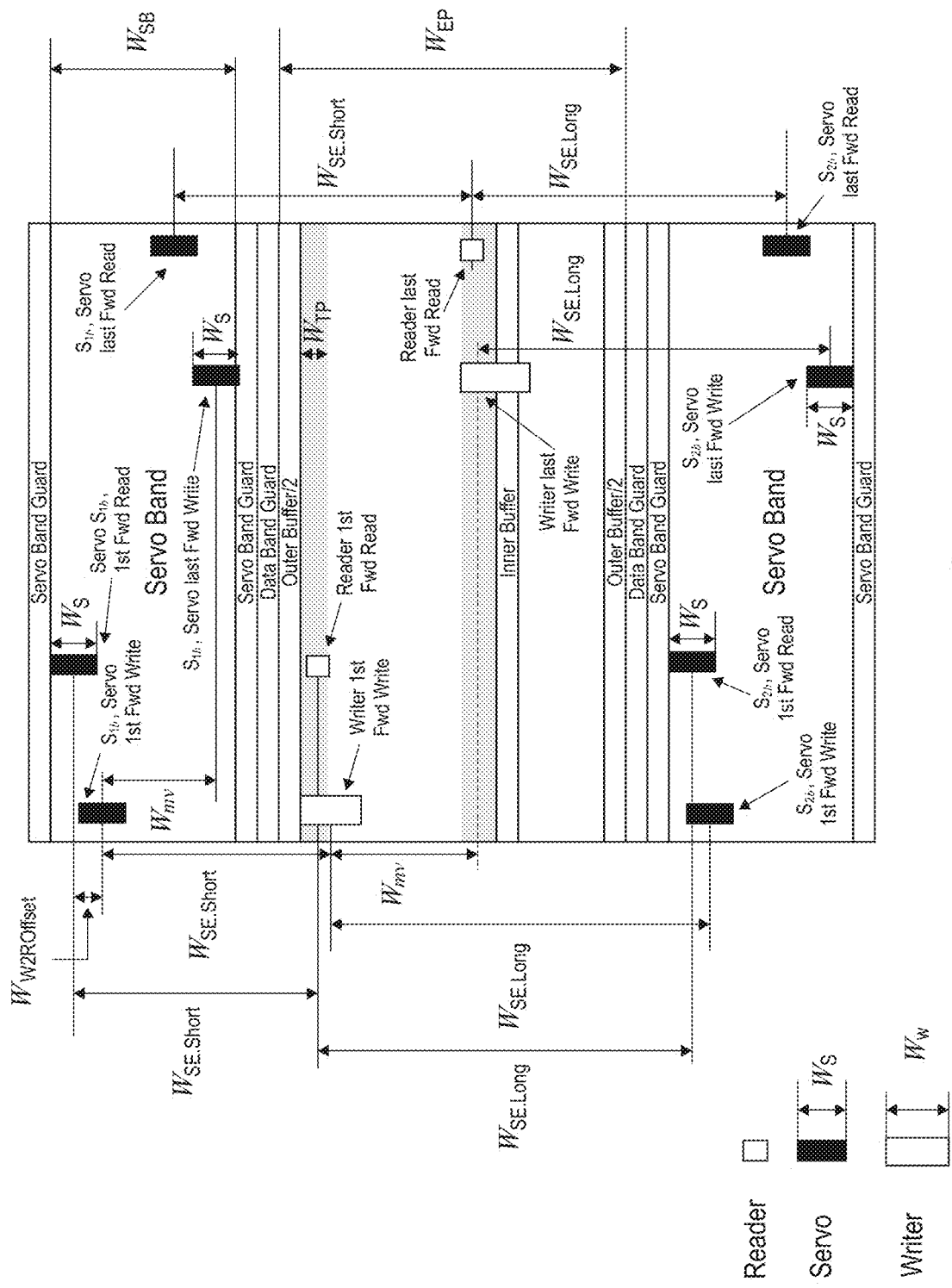
FIG. 12A is a Schematic of the Servo Bands and a single Sub Data Band for Forward Writing and Reading utilizing Servos $S_{1b}$ and $S_{2b}$ according to embodiments of the present disclosure.
Figure 12B:
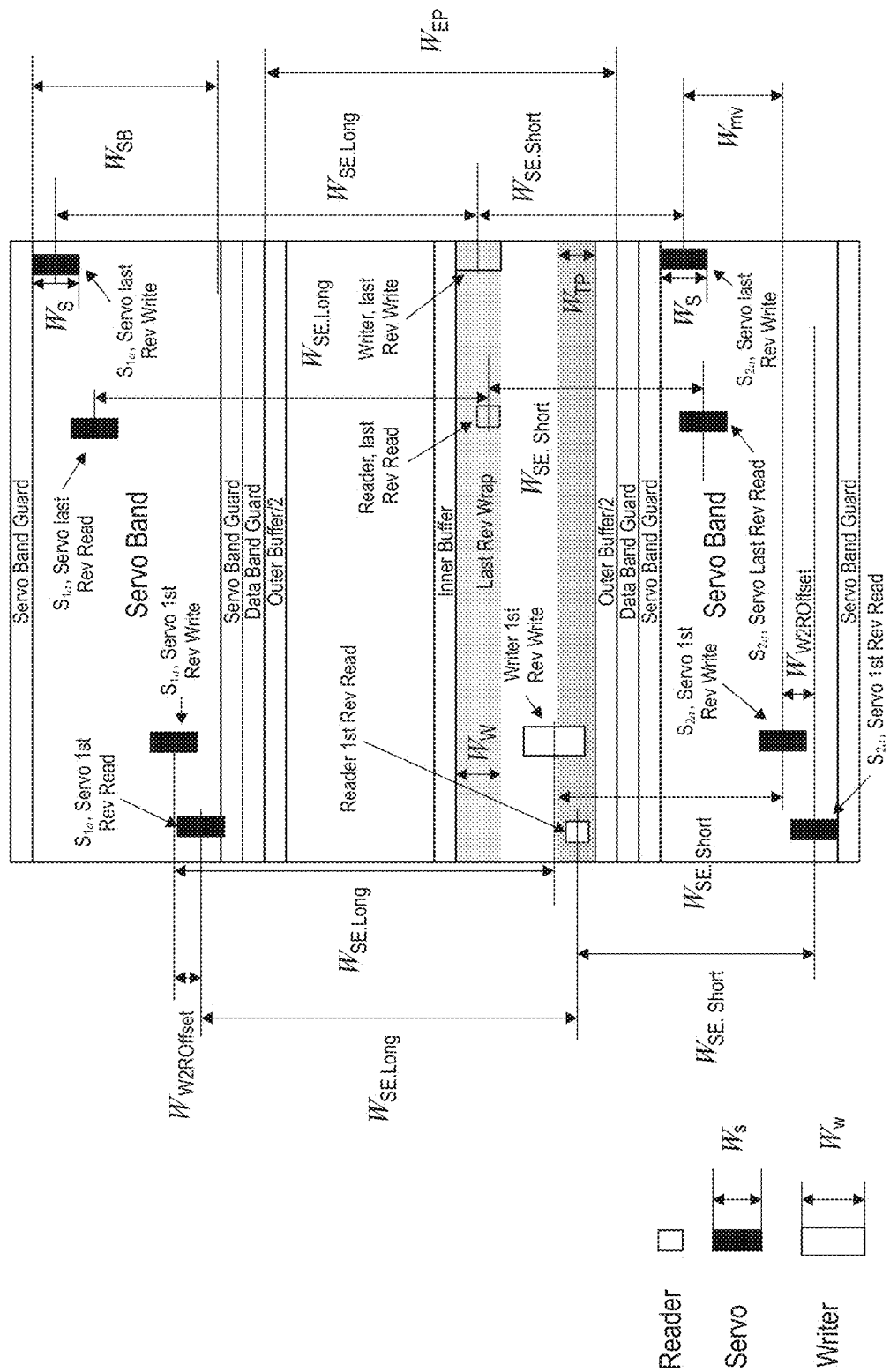
FIG. 12B is a Schematic of the Servo Bands and a single Sub Data Band for Reverse Writing and Reading utilizing Servos $S_{1a}$ and $S_{2a}$ according to embodiments of the present disclosure.

Dual Servo Option for $N_E = N_{CH}$. FIG. 11 shows a schematic of a single band head with dual servos per servo band. The Elements, E.1 to E.$N_E$ can be either a group of $N_E$ Readers, R.1 to R.$N_E$, or Writers, W.1 to W.$N_E$. The servos work in pairs: {S1a and S2a} for Forward or {S1b and S2b} for Reverse Reading and/or Writing. FIG. 12A and FIG. 12B respectively are a Schematics of two Servo Bands surrounding a single Sub Data Band, SDB, for (FIG. 12A) Forward and (FIG. 12B) Reverse Writing and Reading. As will be shown later, the distance from one of each Servo pair to the nearest element will be $W_{SE.Short}$ while the $2^{nd}$ Servo in the pair will have a distance $W_{SE.Long}$, with the subscript "SE" revering to Servo-to-Element and the subscripts "Short" and "Long" for relative distance. The concept can be expanded include any number of SDBs.

FIG. 12A and FIG. 12B are sufficient to determine the distances from a servo to the nearest element and the servo band width. FIG. 8 and FIG. 9 and Equations 1 and 10 then must be used for determining servo-to-servo spans and Element pitch for $N_{DB}>1$, and the length of the Data Band Region is $W_{DB}$, given by Equation 10. Shown are a Top and Bottom servo band with the servo guard band, the data guard bands, the data guard bands between the servo bands and the data band.

Now the positioning of the servos will be described. Focusing on FIG. 12A for the Forward Wraps, $S_{1b}$ will span the Top Servo Band and $S_{2b}$ will span the Bottom Servo Band. The distance between the center of the Top Servo and the center of the first $1^{st}$ Reader can be determined as follows: The highest location of the Servo is during first Forward Read wrap. The top edge of the Top Servo will abut the lower edge of the Top Servo Band and the Readers will be located half a Track Pitch below the top Outer Buffer. Thus, the distance from the Top Servo, $S_{1b}$, to the $1^{st}$ Reader, ($E_1$ in FIG. 10a), is $W_{SE.Short}$, and is given as:

$$W_{SE.Short} = W_{SB} - \frac{W_S}{2} + W_{SBG} + W_{DBG} + \frac{W_{OutBuff}}{2} + \frac{W_{TP}}{2}. \quad 22$$

This is the same Equation as used for the Single Servo option, but $W_{SB}$ will be different as shown below. Here is where the difference occurs. For the first Forward Wrap, the top edge of the servo used in the lower Servo Band will abut the lower edge of the top Servo Band Guard in that Servo Band (i.e., Top edge of the bottom servo band in FIG. 12A). The separation from the last Reader, $E_{NE}$, to the lower servo, $S_{2b}$, is labeled $W_{SE.Long}$.

$$W_{SE.Long} = W_{EP} - \frac{W_{OuterBuf}}{2} - \frac{W_{TP}}{2} + W_{DBG} + W_{SBG} + \frac{W_S}{2}. \quad 23$$

The primary dimension determining the distance between the servo and the closest Read Element is $W_{SB}$ for $W_{SE.Short}$ and $W_{EP}$ for $W_{SE.Long}$. Since each pair of Servos only spans half the Data Band for the Even wraps, $W_{SB} \sim W_{EP}/2$, as will be shown below.

The Odd Wraps will also use a pair of Servos, and by symmetry, they will have the same dimensions as the Even Wraps, except they will be reversed, with $S_{SE.Long}$ (with $W_{SE.Long}$ being in the Top Servo Band and $W_{SE.Short}$ being in the Bottom Servo Band. Thus, the order of elements from Top to Bottom will be: $S_{Long}$, $S_{Short}$, $N_E$ elements, $S_{Short}$, $S_{Long}$, or in FIG. 11: $S_{1a}$, $S_1b$, $N_E$ elements, $S_{2a}$, $S_{2b}$. The Servo Span, or distance from the Top Servo to the Bottom Servo will then be:

$$W_{ServoSpan.Even2S} = W_{SE.Short} + W_{SE.Long} + (N_E - 1) \cdot W_{EP}. \quad 24$$

The reverse wraps, shown in FIG. 12B, are similarly analyzed with the same results. The next step will be to determine the length of the Servo Band. Observing FIG. 12A, the top of the Servo band is a distance $$\frac{W_S}{2}$$

above the center of $S_{1b}$ positioned for the first Forward Read Wrap. For the first Forward Write Wrap, the Writers are positioned so the top edge of the Writer abuts the lower edge of the top Outer Buffer region (width $W_{OutBuf}/2$). For the first Forward Wrap, the distance between the center of the Writer and Reader is $W_{W2ROffset}$:

$$W_{W2ROffset} = (W_W - W_{TP})/2. \quad\quad 25$$

The Writer then will write $N_{trk}$ Wraps, stepping a distance $W_{TP}$ per Wrap (see FIGS. 7 and 11a). The distance moved, $W_{mv}$, is then:

$$W_{mv} = \left(\frac{N_{Trk}}{2} - 1\right) \cdot W_{TP}. \quad\quad 26$$

The lower edge of the servo will abut the top of the lower Servo Band Guard, which is $$\frac{W_S}{2}$$

below the center of the servo. The Servo Band width, $W_{SB}$, is given by the sum of the terms described above.

$$W_{SB} = \frac{W_S}{2} + W_{W2ROffset} + W_{mv} + \frac{W_S}{2}. \quad\quad 27a$$

Combining Equations 25, 26 and 27a gives:

$$W_{SB} = W_S + \left(\frac{N_{Trk}}{2} - 1\right) \cdot W_{TP} + \frac{W_W - W_{TP}}{2}. \quad\quad 27b$$

Substituting 10b into 27b (using $N_{Trk}$ for $N_{TrkR}$ from 12b) yields $W_{SB}$ in terms of $W_{EP}$:

$$W_{SB} = \frac{W_{EP} - W_{OutBuf} - W_{InBuf}}{2} + W_S - W_{TP}. \quad\quad 27c$$

To first order $$W_{SB} \sim \frac{W_{EP}}{2} + W_S - W_{TP}. \quad\quad 27d$$

Or to within the width of $W_S$:

$$W_{SB} \sim \frac{W_{EP}}{2}. \quad\quad 27e$$

The final dimension needed is $W_{EP}$, which is solved using Equation 9 for $W_{Tape}$, which contains the dimensions $W_{DB}$ (Equation 8) and $W_{SB}$ (Equation 20c):

$$W_{EP} = \left(\frac{W_{Tape} - 2 \cdot W_{Edge} - 2 \cdot N_{DB} \cdot W_{DBG} - (N_{DB} + 1) \cdot}{\left(N_E \cdot N_{DB} + \frac{(N_{DB}+1)}{2}\right)}\right). \quad\quad 28$$

The optimum choice of Element Pitch, $W_{EP}$, is then determined using the Tape input values of Tape Width $W_{Tape}$, Edge Guard Band width $W_{Edge}$, Number of Data Bands $N_{DB}$, and the head/drive parameter of the number of Elements $N_E$ and the Servo Band Guard $W_{SBG}$ and Data Band Guard $W_{SBG}$ and the Outer and Inner Buffers $W_{OutBuf}$ and $W_{InBuf}$ chosen for drive operation. To first order, $W_{EP}$ is:

$$W_{EP} \sim \frac{W_{Tape} - 2 \cdot W_{Edge}}{N_E \cdot N_{DB} + \frac{(N_{DB}+1)}{2}}, \quad\quad 29a$$

$W_{EP}$ can be further approximated with a loss of ~1% in accuracy as:

$$W_{EP} \sim \frac{W_{Tape} - 2 \cdot W_{Edge}}{N_E \cdot N_{DB}}, \quad\quad 29b$$

Which, to first order, is the used portion of tape ($W_{Tape}$−2·$W_{Edge}$) divided by the total number of Sub Data Bands ($N_E$·$N_{DB}$).

Figure 13:
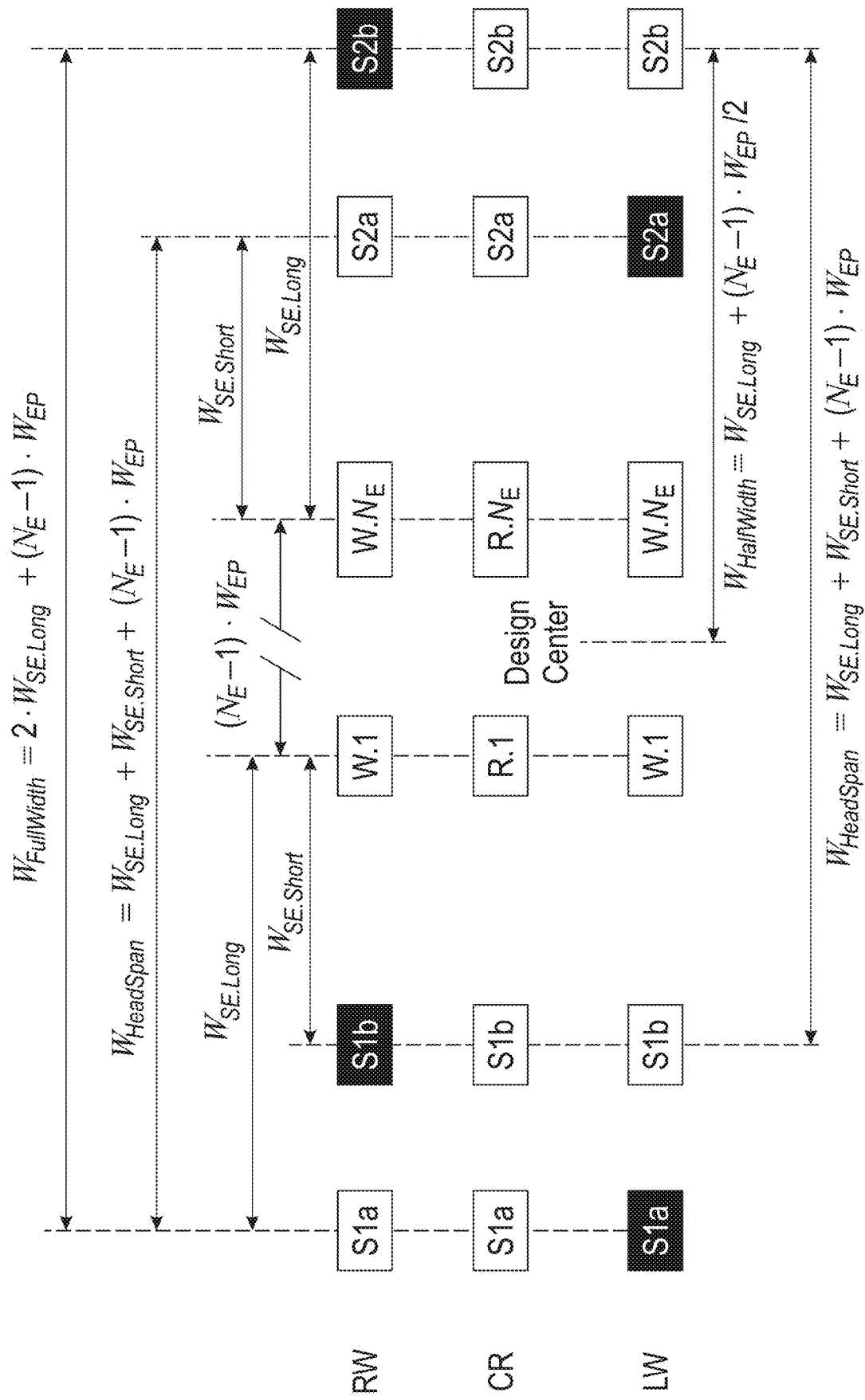
FIG. 13 is a schematic for a 1-Band Head with $N_E$ elements utilizing Dual Servo Option for a 3-module Head alignment with a Left (LW) and Right (RW) Writer and Center Reader (CR) according to embodiments of the present disclosure.

Head Assembly/Alignment, 1-Band Head and Dual Servo Option. A 1-Band Head is one where the elements span a single band, surrounded by Servo Bands. FIG. 13 is a schematic for a 1-Band Head with $N_E$ Elements utilizing Dual Servo Option. FIGS. 12A-B describe the operation of Forward and Reverse Writing/Reading for a 1-Band Head. In practice, a head requires alignment of Readers and Writers to operate in Read-While-Write and Read-Only modes. FIG. 13 shows the alignment and assembly schematic for a 3-module Head alignment with a Left (LW) and Right (RW) Writer and Center Reader (CR). To match FIG. 13 alignment with FIG. 12A-B, the picture is rotated 90 degrees clockwise. LW refers to media traveling from Left to Right in FIG. 12A for Forward motion so LW will be writing and the Center Reader, CR, will be reading Even Wraps. RW refers to media traveling from Right to Left in FIG. 12B so LW will be writing and the Center Reader, CR, will be reading Odd Wraps. For Forward Wraps, Servos, $S_{1b}$ and $S_{2b}$ will be used by both the CR and the LW, so $S_{1a}$ and $S_{2a}$ are "hashed out" in FIG. 13 for the LW. For Reverse Wraps, Servos, $S_{1a}$ and $S_{2a}$ will be used by both the CR and the RW, so $S_{1b}$ and $S_{2b}$ are "hashed out" in FIG. 13 for the RW.

Figure 14:
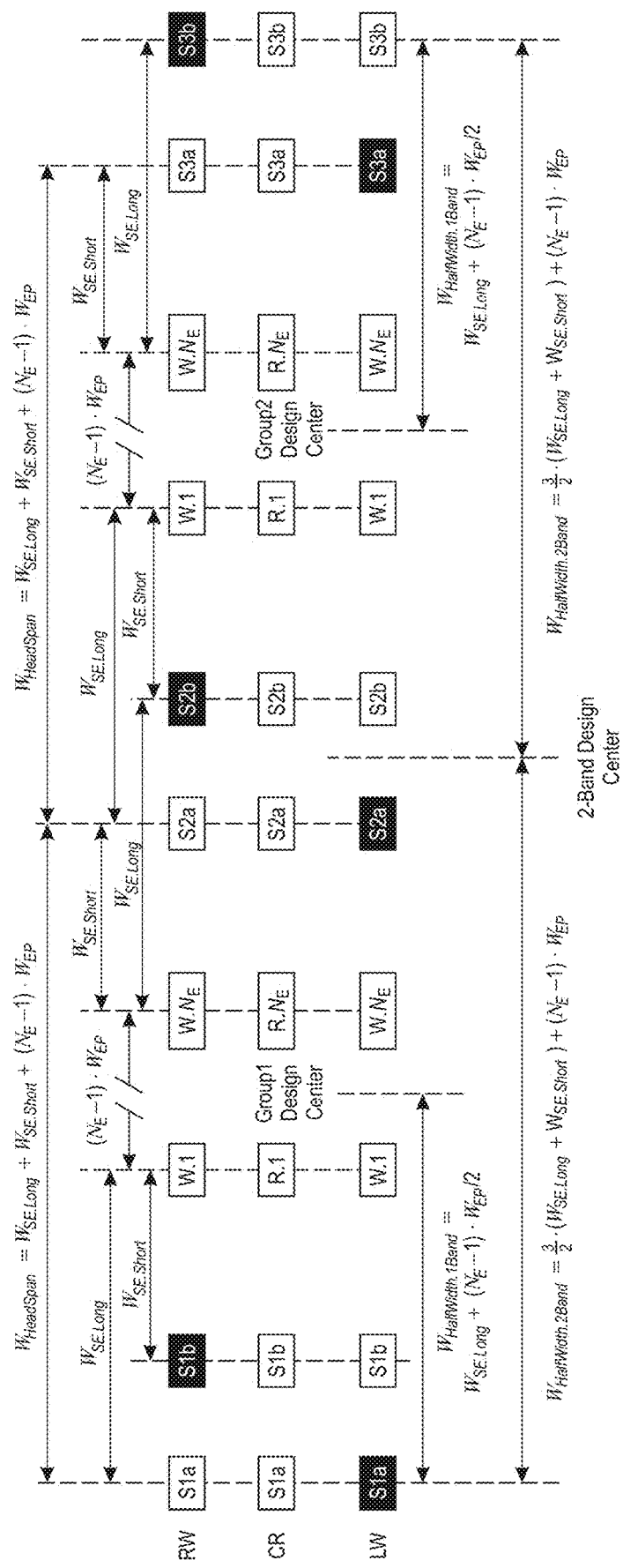
FIG. 14 is a schematic for a 2-Band Head with $N_E$ Elements in each Group (A and B) utilizing Dual Servo Option for a 3-module Head alignment with a Left (LW) and Right (RW) Writer and Center Reader (CR) according to embodiments of the present disclosure.

Head Assembly/Alignment, 2-Band Head and Dual Servo Option. A 2-Band Head is one where the elements span two bands, half the Elements are in one band and the other half are in an adjacent band, with 3 groups of servos in 3 Servo Bands. For a 2-Band Head, the Media must have an even number of Data Bands with data being written to or read from two adjacent data bands simultaneously. The arrangement during Read or Write is: SB, DB, SB, DB, SB. FIG. 14 is a schematic for a 2-Band Head with $N_E$ Elements in each Group (A and B) utilizing Dual Servo Option for a 3-module Head alignment with a Left Writer, (LW), a Right Writer, (RW), and Center Reader, (CR). To match FIG. 14 alignment with FIG. 12A-B, the picture is rotated 90 degrees clockwise. LW refers to media traveling from Left to Right in FIG. 12A-B so LW will be writing and the Center Reader, CR, will be reading Even Wraps (Forward or Fwd.). RW refers to media traveling from Right to Left in FIG. 12A-B so RW will be writing and the Center Reader, CR, will be reading Odd Wraps (Reverse or Rev.). S Servos, $S_{nb}$, will be used for Even (Forward) Wraps and T Servos, $S_{na}$, for Odd (Reverse) Wraps (or vice versa).

Figure 15:
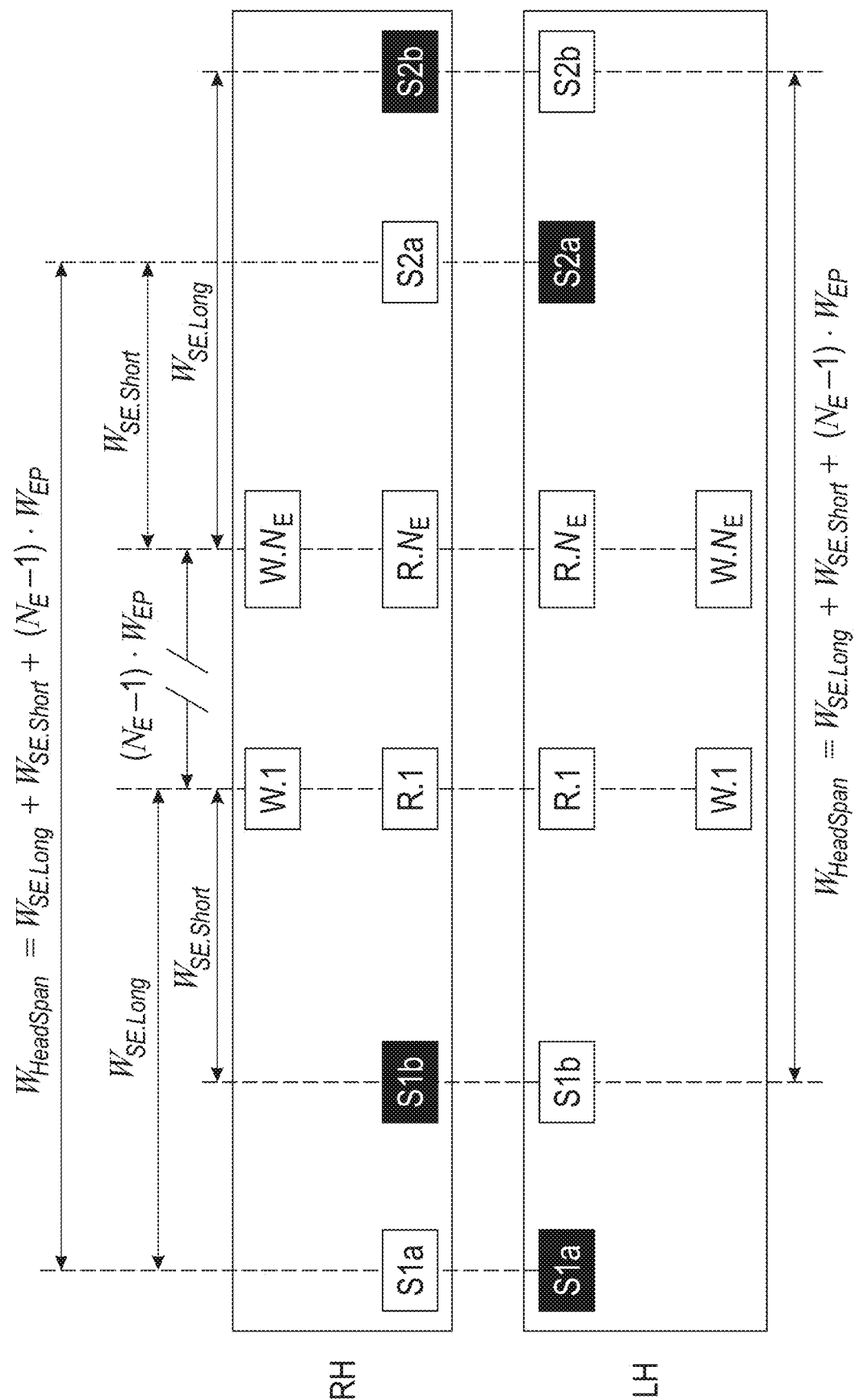
FIG. 15 is a schematic for a 1-Band Head with $N_E$ elements utilizing Dual Servo Option for a 2-module Head alignment with a Left (LH) and Right (RH) Head, both with $N_E$ Readers and $N_E$ Writers according to embodiments of the present disclosure.

As described earlier, a 3-module head is not the only functional design for a linear tape product. One could also build a 2-module head which has both Readers and Writers on each module. FIG. 15 shows a schematic of a 2-module head.

For the 2-module head, the servos are placed in the line of the readers in the design since they are built simultaneously on the wafer. While it is possible to make multiple process steps in the wafer build, to place the Readers and Servos in different layers, it is substantially more expensive. The Writers are placed on the outside of the head since the Readers from the same module will read while the writers are writing. In Forward motion, Tape flows from bottom of the LH from the Writer side to the Reader side. For Reverse writing, Tape moves from the top of the RH from the Writer side to the Reader side. For Read-While-Write, Reading from the same module as writing has the advantage for alignment, especially in the case of the rotated head where alignment will be better. It is equally possible to reverse the ordering (rotate both modules around 180 degrees) and reverse the ordering of the Module Read/Write. Another possibility is to write in one module and read in the second module.

Because of the cost of a wafer and Servo writer for the media, a general design is often reused for several generations. The head design of Element Pitch and Servo locations remain fixed and only parameters such as Reader and Writer widths and track pitch are changed to achieve higher capacity. The media servo pattern locations and widths remain unchanged, only modifying the media properties such as magnetic layers, surface roughness, substrate thickness and length needed for higher capacity.

The change in the optimum Element Pitch is not affected by the writer width.

$$\frac{\partial W_{EP}}{\partial W_W} = \frac{\partial W_{SE.Long}}{\partial W_W} = \frac{\partial W_{SE.Short}}{\partial W_W} = 0 \qquad 30$$

The dependence on optimized $W_{EP}$ and a change in $W_{TP}$ is given by:

$$\frac{\partial W_{EP}}{\partial W_{TP}} = \frac{(N_{DB}+1)}{\left(N_E \cdot N_{DB} + \frac{(N_{DB}+1)}{2}\right)} \sim 1/N_E \qquad 31$$

For $N_E$=64 and $W_{TP}$ changing from 500 to 200 nm, the change in the optimum $W_{EP}$ is only 4.7 nm. By using a design calculated for a fixed $W_{TP}$ of say 350 nm to optimize for track pitches ranging from 500 to 200 nm, the head will function for the full range with minor or no reduction in the capacity ($N_{trk}$) for a $W_{TP}$ other than 350 nm.

The change in $W_{SE.Long}$ and $W_{SE.Short}$ with changes in $W_{TP}$ are given here:

$$\frac{\partial W_{SE.Long}}{\partial W_{TP}} = \frac{\partial W_{SE.Short}}{\partial W_{TP}} = -0.5 \text{ nm/nm} \qquad 32$$

A change in $W_{TP}$ by ±150 nm will change the optimum $W_{SE.Long}$ and $W_{SE.Short}$ by ±75 nm, which is minimal with buffers of 1 mm or more. By using a design calculated for a fixed $W_{TP}$ of $W_{TP.Nom}$=350 nm, the head will function for the full range with minor or no reduction in the capacity ($N_{trk}$) for $W_{TP}$ other than 350 nm. Since the design will be for a given media, the locations and sizes of the servo patterns remain unchanged resulting in only minor or no reduction in the capacity achieved compared to the optimum.

Figure 16A:
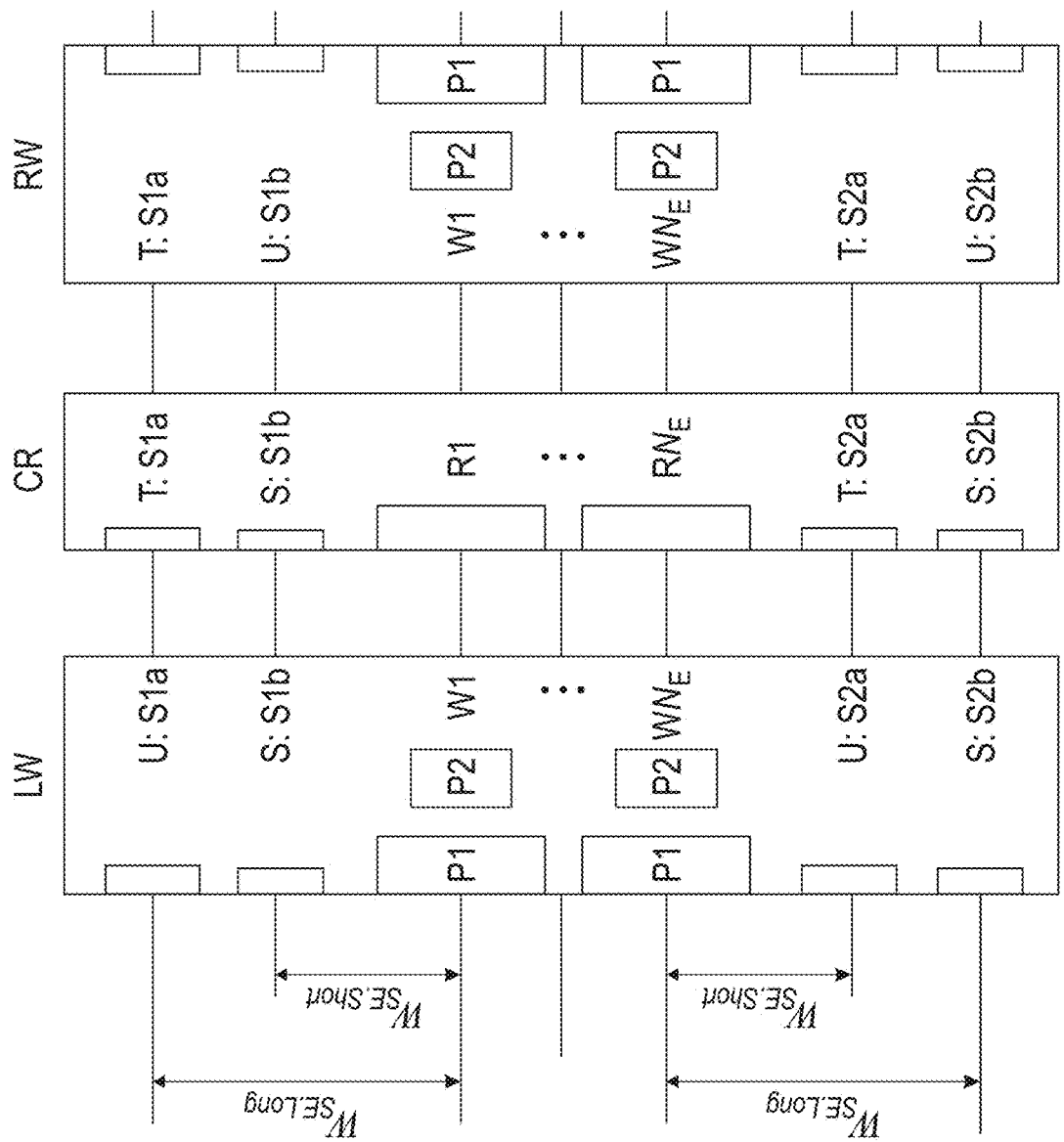
FIGS. 16A-B are schematics for a 1-Band Head with $N_E$ Elements utilizing Dual Servo Option for a 3-module Head alignment with a Left (LW) and Right (RW) Writer and Center Reader (CR) according to embodiments of the present disclosure.
Figure 16B:
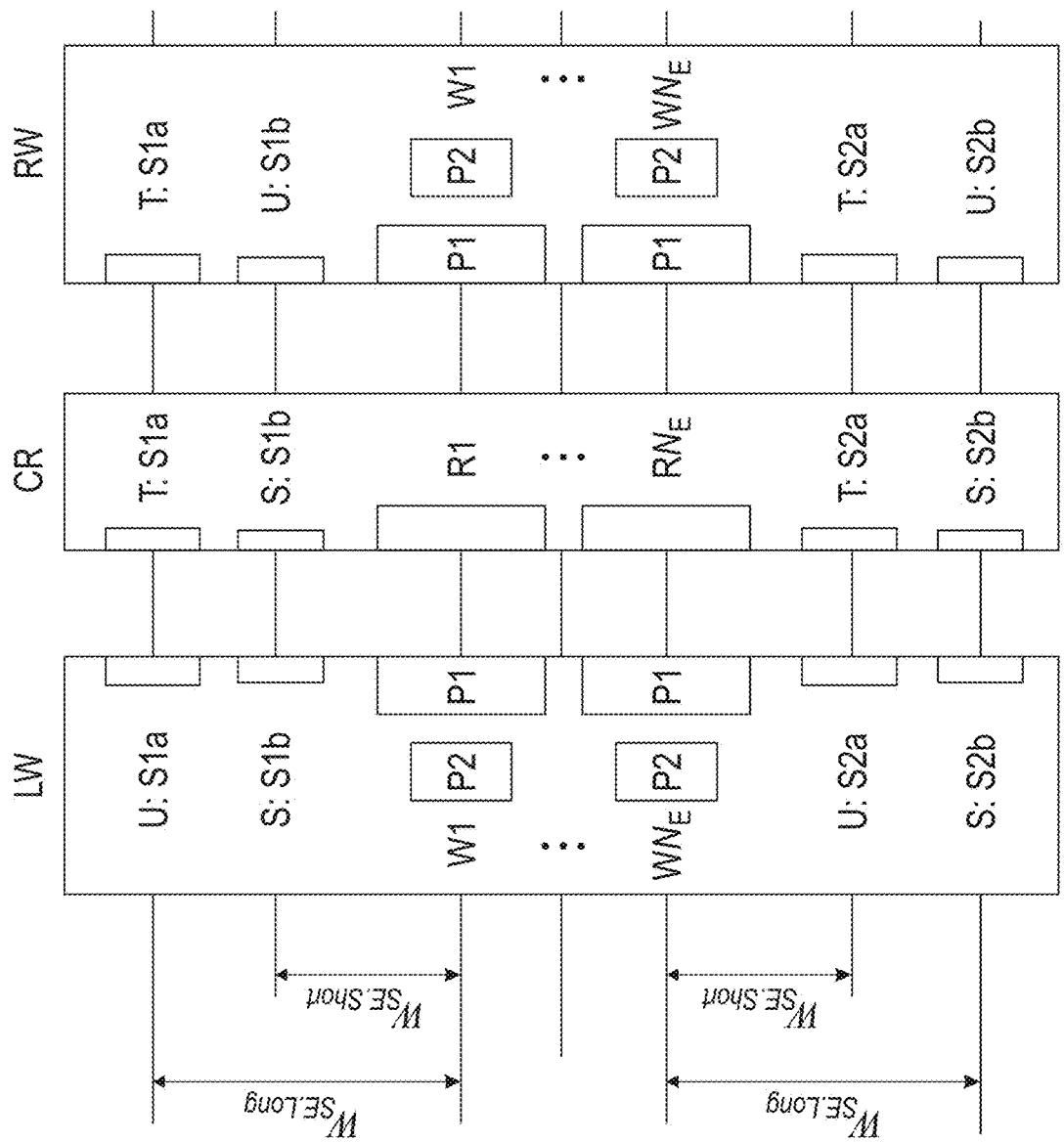

Various Reader and Writer Tape heads are developed by depositing material onto a ceramic substrate. The deposition is built vertically. For a ringed writer, the first pole deposited is termed P1 and the latter deposited pole is P2. From the tape bearing surface, TBS, one sees the outline of P1, a Gap of non-magnetic material and P2. FIGS. 16A-B provides a schematic for a 1-Band Head with $N_E$ Elements utilizing Dual Servo Option for a 3-module Head alignment with a Left (LW) and Right (RW) Writer and Center Reader (CR). The LW and RW respectively write while Media moving from Left-to-Right and Right-to-Left. In FIG. 16A, the writer pole P2 is the trailing edge. In FIGS. 16B, the writer pole P1 is the trailing edge. Because of processing constraints, the geometry of P1 and P2 are often different. The trailing pole material dominates the quality of the written magnetic bit transition. Because of differences in processing either P1 or P2 trailing could be preferable. With the symmetric design described in this disclosure, one can use either P1 or P2 trailing without modifying the drive code. Because of the long time and large cost in building wafers and developing drive code, the versatility in enabling either P1 or P2 trailing designs with the same wafer is highly beneficial in time, effort and cost.

Tilted Head for Tape Dimensional Stability Compensation. In writing data to tape with a multi-Element Read/Write head, the spacing between elements can increase or decrease due to changes in spacing on the head or in the media. Expansion or contraction of the head or media width due to thermal or humidity or other stresses can occur. One means of correcting for these changes is to tilt the head at an angle relative to the track direction. For example, if the media moves in the x direction and the track pitch is in the y direction, rotating the head by an angle q relative to the y axis will shorten the track pitch in the frame of the tape. The head can be built with a fixed value of $\theta_o$ and active compensation of the angle about the center can be done. The analysis given so far can be generalized to include the head tilt concept by analyzing the dimensions in the reference of the media. Thus, the media dimensions, $d_{media}$, are fixed and the head dimensions, $d_{head}$, are translated to the media reference plane by multiplying by $\cos(\theta_o)$. The calculations for the head dimensions for parameter X, $W_{X.Head}$, are then done in the reference plane of the media as transformed dimensions, $W_{X.Tape}$ and visa versa:

$$W_{X.Tape} = \cos(\theta_o) \cdot W_{X.Head} \qquad 33$$

Media parameters include: $W_{Tape}$, $W_{Edge}$, $W_{DB}$, $W_{DBG}$, $W_{SB}$, $W_{SBG}$, $W_{OutBuf}$, $W_{InBuf}$ and $W_{TP}$.

Head parameters include: $W_S$, $W_W$, $W_R$, and $W_{EP}$.

Figure 17:
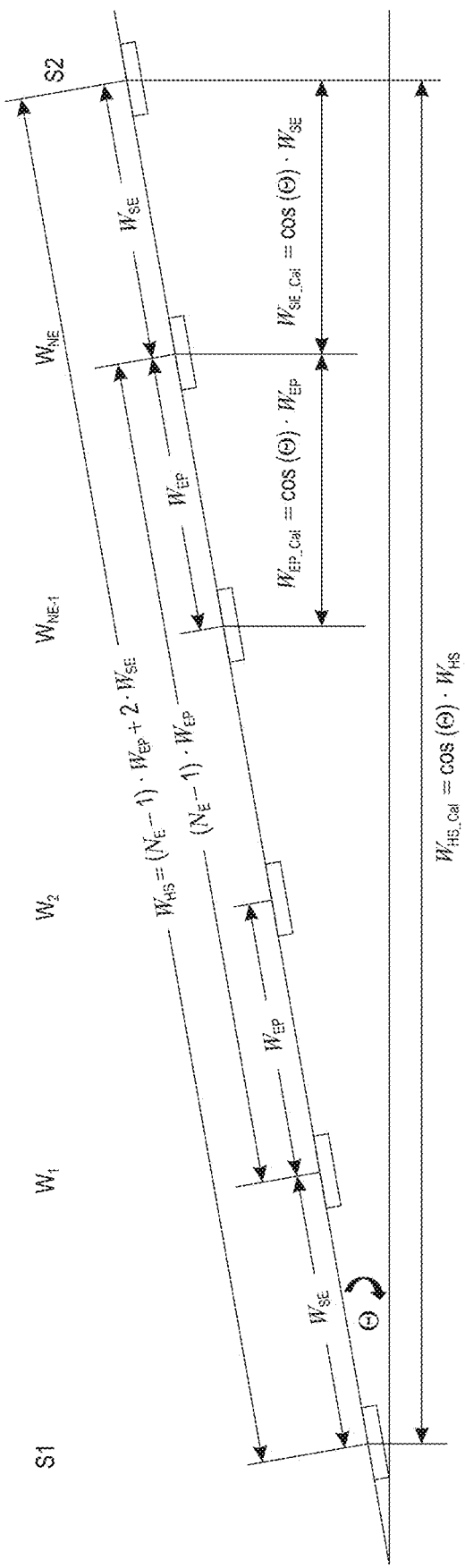
FIG. 17 is a schematic of the Tilted Head Concept for TDS compensation according to embodiments of the present disclosure.

FIG. 17 is a schematic of the Tilted Head Concept for TDS compensation, showing the above concept pictorially.

The only head dimension for determining the element pitch is the servo width. Thus, for a tilted head, the dimensions the Element pitch on tape, $W_{EP.Tape}$, is derived from Equation 28 using the servo width converted to Tape dimension, $W_S \rightarrow W_S \cdot \cos(\theta_o)$, and with Data Band Guard set to zero (0), $W_{DBG}=0$:

$$W_{EP.Tape} = \left( \frac{W_{Tape} - 2 \cdot W_{Edge} - (N_{DB}+1)(W_S \cdot \cos(\theta_o) + 2 \cdot W_{SBG} - W_{TP} + (W_{OutBuf} - W_{InBuf})/2)}{\left(N_E \cdot N_{DB} + \frac{(N_{DB}+1)}{2}\right)} \right). \quad 34a$$

$W_{EP.Tape}$ is approximated by:

$$W_{EP.Tape} \sim \frac{W_{TApe} - 2 \cdot W_{Edge}}{N_E \cdot N_{DB} + \frac{(N_{DB}+1)}{2}}. \quad 34b$$

The error in $W_{EP.Tape}$ using Equation 34b is approximately.

$$\Delta W_{EP.Tape1} \sim -\left(\frac{N_{DB}+1}{N_E \cdot N_{DB}}\right) \cdot (W_S \cdot \cos(\theta_o) + 2 \cdot W_{SBG} - W_{TP}). \quad 34d$$

For $W_{Tape}=12{,}650$ μm and $W_{Edge}=500$ μm, Equation 34b yields $W_{EP.Tape}$ 89.27 μm. With $W_{DBG}=0$, $N_{DB}=4$, $N_E=32$, $W_S$ 2 mm, $\theta_o=10$ deg, $W_{SBG}=7$ μm, and $W_{OutBuf}=W_{InBuf}$ the error in $W_{EP.Tape}$, $\Delta W_{EP.Tape1}$, is 0.18 μm or 0.2%. $W_{EP.Tape}$ can be further approximated to:

$$W_{EP.Tape} \sim \frac{W_{Tape} - 2 \cdot W_{Edge}}{N_E \cdot N_{DB}}. \quad 34e$$

With $N_{DB}=4$ and $N_E=32$, the additional error is about 2%:

$$\frac{\Delta W_{EP.Tape2}}{W_{EP.Tape}} \sim \frac{N_{DB}+1}{2N_E \cdot N_{DB}}. \quad 34f$$

The Element pitch on the head is determined using Equation 33 as:

$$W_{EP.Head} = \frac{W_{EP.Tape}}{\cos(\theta_o)}. \quad 35a$$

Combining Equations 34b and 35a yields an approximation for $W_{EP.Head}$ to an accuracy of 0.2% of:

$$W_{EP.Head} \sim \frac{W_{Tape} - 2 \cdot W_{Edge}}{\left(N_E \cdot N_{DB} + \frac{(N_{DB}+1)}{2}\right) \cdot \cos(\theta_o)}. \quad 35b$$

Equation 35b can be further approximated combining 34c with 35a to an accuracy of about 2%:

$$W_{EP.Head} \sim \frac{W_{Tape} - 2 \cdot W_{Edge}}{N_E \cdot N_{DB} \cdot \cos(\theta_o)}. \quad 35c$$

The Servo buffer is converted from Equation 27c to:

$$W_{SB.Tape} = \frac{W_{EP.Tape} - W_{OutBuf} - W_{InBuf}}{2} + W_S \cdot \cos(\theta_o) - W_{TP}. \quad 36a$$

The Servo buffer on tape is approximated by:

$$W_{SB.Tape} \sim \frac{W_{EP.Tape}}{2} + W_S \cdot \cos(\theta_o) - W_{TP.Nom}. \quad 36b$$

The error in Equation 36a using 36b is:

$$\Delta W_{SB.Tape} = -\frac{W_{OutBuf} + W_{InBuf}}{2} - (W_{TP} - W_{TP.Nom}). \quad 36c$$

With $W_{OutBuf}=W_{InBuf}=0.25$ μm, and $W_{TP.Nom}=0.35$ μm, and $0.2$ μm$\leq W_{TP} \leq 0.5$ μm, the error in $W_{SB.Tape}$ using the approximation of 36b rather than 36a is between $-0.1$ μm and $-0.4$ μm, which is easily accounted for with a $W_{SBG} \sim 7$ μm.

Inserting Equation 34e into 36b yields:

$$W_{SB.Tape} \sim \frac{W_{Tape} - 2 \cdot W_{Edge}}{2 \cdot N_E \cdot N_{DB}} + W_S \cdot \cos(\theta_o) - W_{TP.Nom}. \quad 36d$$

$W_{SB.Tape}$ can be further reduced to half the element pitch:

$$W_{SB.Tape} \sim \frac{W_{EP.Tape}}{2} = \frac{W_{Tape} - 2 \cdot W_{Edge}}{2 \cdot N_E \cdot N_{DB}}. \quad 36e$$

The error in using Equation 36e rather than 36d is primarily from $W_S$, which can be up to about 2 μm which is on the order of a 4% error.

Another important parameter for the tape is $W_{ServoSpan.Tape}$, which is the distance from the center of one servo band and the next. This can be derived in two ways. One derivation of $W_{ServoSpan.Tape}$ is by viewing the physical distance between the center of the two servo bands in FIGS. 11a and 11b. Setting $W_{DBG}=0$:

$$W_{ServoSpan.Tape} = W_{SB.Tape} + N_E \cdot W_{EP.Tape} + 2 \cdot W_{SBG} \quad 37$$

The second means to derive $W_{ServoSpan.Even2S}$ is using the Servo band dimensions, $W_{SE.Short}$ and $W_{SE.Long}$ using Equations 22, 23 and 24 with 33. Setting $W_{DBG}=0$ yields:

$$W_{SE.Short.Tape} = W_{SB.Tape} - \frac{W_S \cdot \cos(\theta_o)}{2} + W_{SBG} + \frac{W_{OutBuff}}{2} + \frac{W_{TP}}{2}. \quad 38a$$

$$W_{SE.Long.Tape} = W_{EP.Tape} - \frac{W_{OuterBuf}}{2} - \frac{W_{TP}}{2} + W_{SBG} + \frac{W_S \cdot \cos(\theta_o)}{2}. \quad 38b$$

$$W_{ServoSpan.Tape} = \quad 38c$$
$$W_{SE.Short.Tape} + W_{SE.Long.Tape} + (N_E - 1) \cdot W_{EP.Tape} + 2 \cdot W_{SBG}.$$

For tape dimensions, only the term in 38c, $W_{ServoSpan.Tape}$, is relevant. The Media used is defined by the dimensions: $W_{Tape}$, $W_{Edge}$, $W_{SB.Tape}$, $W_{ServoSpan.Tape}$, and $W_{SBG}$. Inserting Equations 38a and 38b into Equation 38c yields $W_{ServoSpan.Tape}$:

$$W_{ServoSpan.Tape} = W_{SB.Tape} + N_E \cdot W_{EP.Tape} + 2 \cdot W_{SBG}. \quad 39$$

Equations 37 and 39 agree.

$W_{SB.Tape}$ and $W_{EP.Tape}$ are given by Equations 34a and 36a or approximated as 34b and 36d. Variations in the actual values of $W_{Tape}$ and $W_{Edge}$ of even 10s of microns don't substantially affect the results since end results are the head parameter definitions, and the tape definitions of $W_{ServoSpan.Tape}$ and $W_{SB.Tape}$.

Next is the calculation of the head parameters.

$W_{SB.Head}$ can be converted from Equation 36d with 33 to $W_{SB.Head}$:

$$W_{SB.Head} \sim \frac{W_{Tape} - 2 \cdot W_{Edge}}{2 \cdot N_E \cdot N_{DB} \cdot \cos(\theta_o)} + W_S - \frac{W_{TP.Nom}}{\cos(\theta_o)}. \quad (40)$$

However, $W_{SB.Head}$ is not a physical parameter of the head and is only useful for calculations.

Inserting $W_{SB.Tape}$ from Equation 36b into 39 yields:

$$W_{ServoSpan.Tape} = \left(N_E + \frac{1}{2}\right) \cdot W_{EP.Tape} + W_S \cdot \cos(\theta_o) + 2 \cdot W_{SBG} - W_{TP.Nom}. \quad (42a)$$

Inserting $W_{EP.Tape}$ from Equation 34b into 38b yields:

$$W_{SB.Tape} \sim \frac{W_{EP.Tape}}{2} + W_S \cdot \cos(\theta_o) - W_{TP.Nom}, \quad (42b)$$

with $W_{EP.Tape}$ given by 34b or 34e with respective errors of 0.2% and 2%.

To set the media specifications, the designers can define $W_{Tape}$, $W_{Edge}$, $W_{SB.Tape}$, and $W_{SBG}$, calculate a $W_{ServoSpan.Tape}$. The specifications then define a nominal tape width with a loose tolerance, such as 10 or 20 mm width dimension, or whatever tolerances are required for physically running the tap. The specification on $W_{ServoSpan.Tape}$ must be tightly defined within a range that can be compensated for environmental and aging changes, say within ±1 mm (Swanson). $W_{SB.Tape}$ can then be set to be the calculated value as the minimum, $W_{SB.Tape}$.cal as the value in Equation 36b, and the maximum adding $W_{SB.Tape}$.cal+$W_{SBG}$.

Now for the head definitions. Repeating Equation 35b for the element pitch on the head, $W_{EP.Head}$, for an accuracy of about 0.2%:

$$W_{EP.Head} \sim \frac{W_{Tape} - 2 \cdot W_{Edge}}{\left(N_E \cdot N_{DB} + \frac{(N_{DB}+1)}{2}\right) \cdot \cos(\theta_o)}. \quad (43a)$$

Or repeating Equation 35c for the element pitch on the head for an accuracy of about 2%:

$$W_{EP.Head} \sim \frac{W_{Tape} - 2 \cdot W_{Edge}}{N_E \cdot N_{DB} \cdot \cos(\theta_o)}. \quad (43b)$$

Next is the servo locations. $W_{SE.Short.Head}$ is calculated from Equations 38a with 33.

$$W_{SE.Short.Head} = \frac{W_{SB.Tape}}{\cos(\theta_o)} - \frac{W_S}{2} + \frac{W_{SBG}}{\cos(\theta_o)} + \frac{W_{OutBuff}}{2 \cdot \cos(\theta_o)} + \frac{W_{TP}}{2 \cdot \cos(\theta_o)}. \quad (44a)$$

Removing the contribution from $W_{OutBuff}$ and replacing $W_{TP}$ with $W_{TP.Nom}$ and using Equation 42b for $W_{SB.Tape}$ gives:

$$W_{SE.Short.Head} = \frac{W_{EP.Head}}{2} + \frac{W_S}{2} + \frac{W_{SBG}}{\cos(\theta_o)} - \frac{W_{TP.Nom}}{2 \cdot \cos(\theta_o)}. \quad (44b)$$

With $W_{TP.Nom}$=350 nm and $W_{TP}$=350±150 nm and $W_{OutBuff}$~250 nm, the error in $W_{SE.Short.Head}$ using Equation 44b rather than 44a is between 50 and 200 nm.

$W_{SE.Long.Head}$ is calculated from Equation 38b with 33:

$$W_{SE.Long.Head} = W_{EP.Head} - \frac{W_{OuterBuf}}{2 \cdot \cos(\theta_o)} + \frac{W_{SBG}}{\cos(\theta_o)} + \frac{W_S}{2} - \frac{W_{TP}}{2 \cdot \cos(\theta_o)}. \quad (45a)$$

Removing the contribution from $W_{OutBuff}$ and replacing $W_{TP}$ with $W_{TP.Nom}$, 45a becomes:

$$W_{SE.Long.Head} = W_{EP.Head} + \frac{W_{SBG}}{\cos(\theta_o)} + \frac{W_S}{2} - \frac{W_{TP.Nom}}{2 \cdot \cos(\theta_o)}. \quad (45b)$$

$W_{ServoSpan.Head}$ can be calculated as:

$$W_{ServoSpan.Head} = W_{SE.Short.Head} + W_{SE.Long.Head} + (N_E - 1) \cdot W_{EP.Head}. \quad (46a)$$

Combining Equations 44b and 45b into 46a yields:

$$W_{ServoSpan.Head} \sim \left(N_E + \frac{1}{2}\right) \cdot W_{EP.Head} + W_S + \frac{2 W_{SBG}}{\cos(\theta_o)} - \frac{W_{TP.Nom}}{\cos(\theta_o)}. \quad (46)$$

Figure 18:
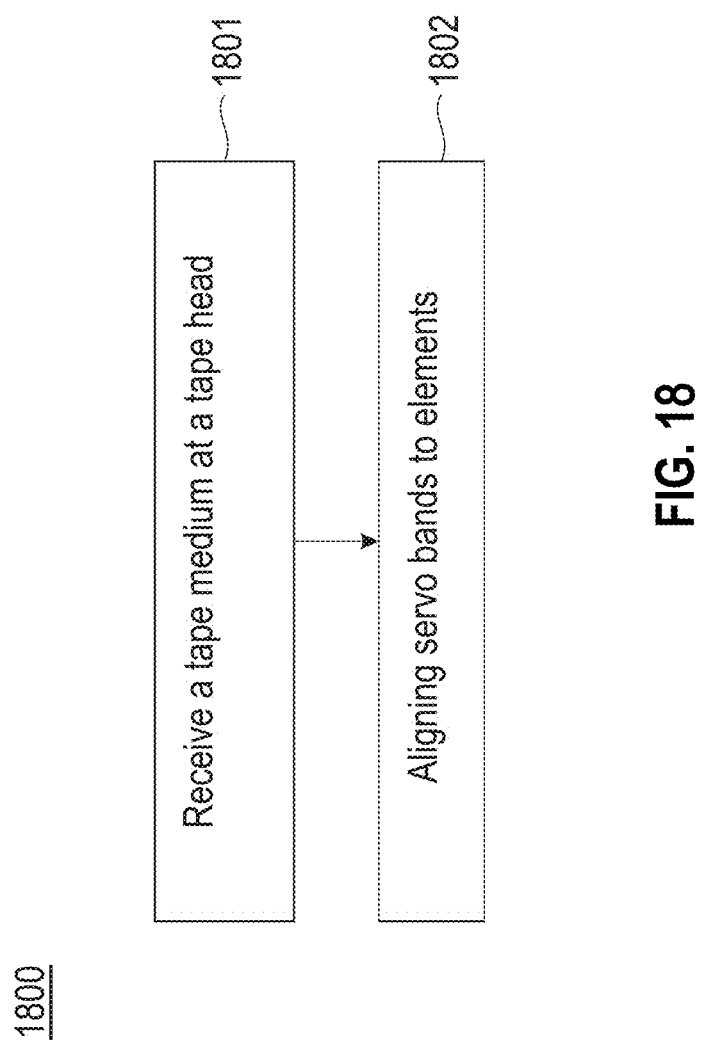
FIG. 18 is a flowchart illustrating a storage method according to embodiments of the present disclosure.

Referring to FIG. 18, a method of accessing a tape medium according to the present disclosure is illustrated. At 1801, a tape medium is received at a tape head as set forth herein. The tape medium has a plurality of servo bands. At 1802, each of the plurality of servo bands is aligned to at least one of the plurality of elements of the tape head.

Figure 19:
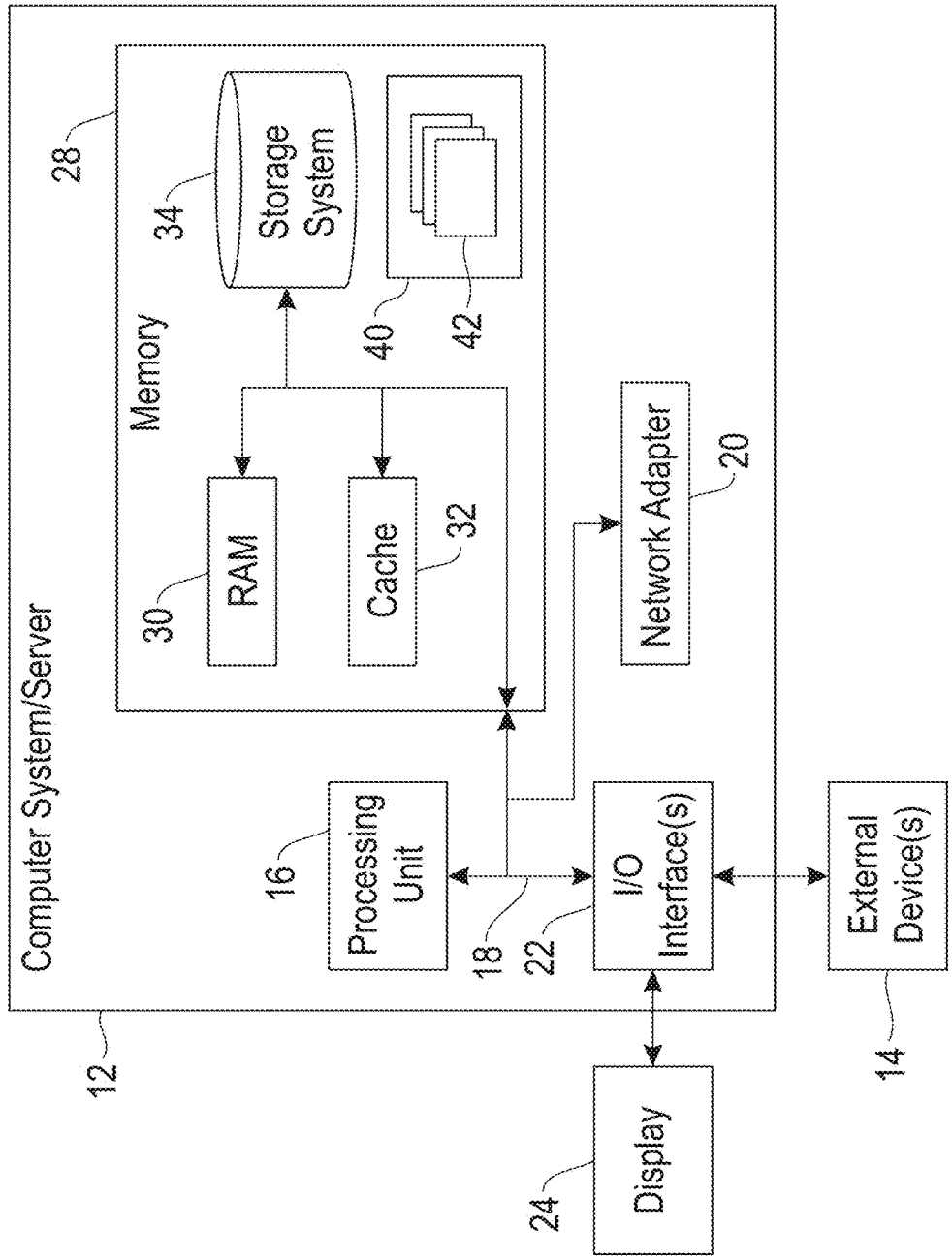
FIG. 19 depicts a computing node according to an embodiment of the present disclosure.

Referring now to FIG. 19, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 19, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A tape head adapted to 32- and 64-channel operation, comprising:
   a plurality of elements numbering $N_E$, comprising 64 evenly-spaced elements, comprising at least a first element, a last element, and a second-to-last element; and
   a plurality of servos, comprising at least a first through fourth servo, wherein
      the 64 evenly-spaced elements of each set are separated by an element pitch ($W_{EP}$),
      the first element and the first servo are separated by a first distance ($W_{SE.Long}$),
      the first element and the second servo are separated by a second distance ($W_{SE.Short}$),
      the second-to-last element and the third servo are separate by the second distance ($W_{SE.Short}$),
      the last element and the fourth servo are separate by the second distance ($W_{SE.Short}$),
      the first servo and the third servo are separated by a third distance equal to $2 \cdot W_{SE.Short} + (N_E - 1) \cdot W_{EP64}$, wherein $W_{EP64} = W_{EP}$, and
   the second servo and the fourth servo are separated by the third distance.

2. The tape head of claim 1, wherein $W_{SE.Long} = W_{SE.Short} + W_{EP64} = W_{SE.Short} + W_{EP32}/2$.

3. The tape head of claim 1, configured to receive a tape medium, the tape medium having a plurality of servo bands.

4. The tape head of claim 3, the plurality of servo bands having a separation equal to the third distance.

5. The tape head of claim 3, the plurality of servo bands having a separation equal to a projection of the third distance according to an alignment of the servos.

6. The tape head of claim 3, wherein each servo band of the tape medium corresponds to one element.

7. The tape head of claim 3, wherein each element addresses one data sub band.

8. The tape head of claim 1, wherein each of the 64 elements is a reader or writer element.

9. The tape head of claim 1, wherein the plurality of elements is symmetrical about a center line.

10. The tape head of claim 1, wherein $W_{EP64} = 43.43$ µm±10%.

11. The tape head of claim 1, wherein $W_{SE.Short} = 56.23$ µm±10%.

12. A tape head adapted to 32-, 64-, and 128-channel operation, comprising:
   a plurality of elements numbering $N_E$, comprising first and second sets of 64 evenly-spaced elements, each set comprising at least a first element, a last element, and a second-to-last element; and
   a plurality of servos, comprising at least a first through sixth servo, wherein
      the 64 evenly-spaced elements of each set are separated by an element pitch ($W_{EP}$),
      the first element of the first set and the first servo are separated by a first distance ($W_{SE.Long}$),
      the first element of the first set and the second servo are separated by a second distance ($W_{SE.Short}$),
      the second-to-last element of the first set and the third servo are separate by the second distance ($W_{SE.Short}$),
      the last element of the first set and the fourth servo are separate by the second distance ($W_{SE.Short}$),
      the first element of second set and the third servo are separate by the first distance ($W_{SE.Long}$),
      the first element of second set and the fourth servo are separate by the second distance ($W_{SE.Short}$),
      the second-to-last element of the second set and the fifth servo are separate by the second distance ($W_{SE.Short}$),
      the last element of the second set and the sixth servo are separate by the second distance ($W_{SE.Short}$),
      the first servo and the third servo are separated by a third distance equal to $2 \cdot W_{SE.Short} + (N_E - 1) \cdot W_{EP64}$, wherein $W_{EP64} \equiv W_{EP}$,
      the second servo and the fourth servo are separated by the third distance,
      the third servo and the fifth servo are separated by the third distance, and
      the fourth servo and the sixth servo are separated by the third distance.

13. The tape head of claim 12, configured to receive a tape medium, the tape medium having a plurality of servo bands.

14. The tape head of claim 13, the plurality of servo bands having a separation equal to the third distance.

15. The tape head of claim 13, the plurality of servo bands having a separation equal to a projection of the third distance according to an alignment of the servos.

16. The tape head of claim 13, wherein each servo band of the tape medium corresponds to one element.

17. The tape head of claim 13, wherein each element addresses one data sub band.

18. The tape head of claim 12, wherein each of the 64 elements of the first and second sets is a reader or writer element.

19. The tape head of claim 12, wherein the plurality of elements is symmetrical about a center line.

20. The tape head of claim 12, wherein $W_{EP64} = 43.43$ μm±10%.

21. The tape head of claim 12, wherein $W_{SE.Short} = 56.23$ μm±10%.

22. A method of accessing a tape medium, the method comprising:
   receiving a tape medium at a tape head, the tape medium having a plurality of servo bands, the tape head comprising:
      a plurality of elements numbering $N_E$, comprising 64 evenly-spaced elements, comprising at least a first element, a last element, and a second-to-last element; and
      a plurality of servos, comprising at least a first through fourth servo, wherein
         the 64 evenly-spaced elements of each set are separated by an element pitch ($W_{EP}$),
         the first element and the first servo are separated by a first distance ($W_{SE.Long}$),
         the first element and the second servo are separated by a second distance ($W_{SE.Short}$),
         the second-to-last element and the third servo are separate by the second distance ($W_{SE.Short}$),
         the last element and the fourth servo are separate by the second distance ($W_{SE.Short}$),
         the first servo and the third servo are separated by a third distance equal to $2 \cdot W_{SE.Short} + (N_E - 1) \cdot W_{EP64}$, wherein $W_{EP64} \equiv W_{EP}$, and
         the second servo and the fourth servo are separated by the third distance; and
   aligning each of the plurality of servo bands to at least one of the plurality of elements.

23. A method of accessing a tape medium, the method comprising:
   receiving a tape medium at a tape head, the tape medium having a plurality of servo bands, the tape head comprising:
      a plurality of elements numbering $N_E$, comprising first and second sets of 64 evenly-spaced elements, each set comprising at least a first element, a last element, and a second-to-last element; and
      a plurality of servos, comprising at least a first through sixth servo, wherein
         the 64 evenly-spaced elements of each set are separated by an element pitch ($W_{EP}$),
         the first element of the first set and the first servo are separated by a first distance ($W_{SE.Long}$),
         the first element of the first set and the second servo are separated by a second distance ($W_{SE.Short}$),
         the second-to-last element of the first set and the third servo are separate by the second distance ($W_{SE.Short}$),
         the last element of the first set and the fourth servo are separate by the second distance ($W_{SE.Short}$),
         the first element of second set and the third servo are separate by the first distance ($W_{SE.Long}$),
         the first element of second set and the fourth servo are separate by the second distance ($W_{SE.Short}$),
         the second-to-last element of the second set and the fifth servo are separate by the second distance ($W_{SE.Short}$),
         the last element of the second set and the sixth servo are separate by the second distance ($W_{SE.Short}$),
         the first servo and the third servo are separated by a third distance equal to $2 \cdot W_{SE.Short} + (N_E - 1) \cdot W_{EP64}$, wherein $W_{EP64} \equiv W_{EP}$,
         the second servo and the fourth servo are separated by the third distance,
         the third servo and the fifth servo are separated by the third distance, and
         the fourth servo and the sixth servo are separated by the third distance; and
   aligning each of the plurality of servo bands to at least one of the plurality of elements.

* * * * *